US012779849B2

(12) United States Patent
Ohara et al.

(10) Patent No.: US 12,779,849 B2
(45) Date of Patent: Nov. 3, 2026

(54) INK JET PRINTING METHOD

(71) Applicant: CANON KABUSHIKI KAISHA, Tokyo (JP)

(72) Inventors: Manabu Ohara, Tokyo (JP); Mikio Sanada, Kanagawa (JP); Shoichi Takeda, Kanagawa (JP); Yoshiyuki Kaneko, Kanagawa (JP); Koichi Ishida, Tokyo (JP); Kyosuke Toda, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/738,905

(22) Filed: Jun. 10, 2024

(65) Prior Publication Data

US 2024/0408869 A1 Dec. 12, 2024

(30) Foreign Application Priority Data

Jun. 12, 2023 (JP) ................................. 2023-095971

(51) Int. Cl.
*B41J 2/14* (2006.01)
*B41J 2/175* (2006.01)
*C09D 11/322* (2014.01)

(52) U.S. Cl.
CPC ............. *B41J 2/14* (2013.01); *B41J 2/17596* (2013.01); *C09D 11/322* (2013.01); *B41J 2202/12* (2013.01)

(58) Field of Classification Search
CPC ...... B41J 2/14; B41J 2/17596; B41J 2202/12; C09D 11/322
See application file for complete search history.

(56) References Cited

U.S. PATENT DOCUMENTS

| | | |
|---|---|---|
| 5,527,121 A | 6/1996 | Santon |
| 9,616,674 B2 | 4/2017 | De Saint Romain |

(Continued)

FOREIGN PATENT DOCUMENTS

| | | |
|---|---|---|
| EP | 3925784 A1 | 12/2021 |
| JP | 2006082336 A | 3/2006 |

(Continued)

*Primary Examiner* — Jason S Uhlenhake
(74) *Attorney, Agent, or Firm* — Canon.U.S.A., .Inc. IP Division

(57) ABSTRACT

In an ink jet printing method for discharging ink from a liquid discharge head, the ink contains titanium oxide having a precipitation velocity of $1.0\times10^{-11}$ m/s or more based on a Stokes equation in the ink, the liquid discharge head comprises a discharge port, a pressure chamber, an energy-generating element for discharging the ink, an upstream flow channel for supplying a liquid to the pressure chamber, a downstream flow channel communicating with the pressure chamber, and a pump communicating with the upstream and downstream flow channels and forming a circulation path in which the ink circulates in an order of the upstream flow channel, pressure chamber, downstream flow channel, and upstream flow channel, and a ratio of the flow rate Q of the ink in the circulation path to the maximum cross-sectional area S of the circulation path, Q/S [m/s], is higher than the precipitation velocity.

18 Claims, 22 Drawing Sheets

(56) References Cited

U.S. PATENT DOCUMENTS

| | | | | |
|---|---|---|---|---|
| 2017/0028736 | A1 * | 2/2017 | Pourtier | B41J 2/17513 |
| 2019/0061382 | A1 | 2/2019 | Okuda | |
| 2021/0394525 | A1 * | 12/2021 | Yamada | B41J 2/18 |

FOREIGN PATENT DOCUMENTS

| | | | | |
|---|---|---|---|---|
| JP | 2011088293 | A | | 5/2011 |
| JP | 2017521348 | A | | 8/2017 |
| JP | 2019163429 | A | * | 9/2019 |
| WO | 2018190848 | A1 | | 10/2018 |

* cited by examiner

INK JET PRINTING METHOD

BACKGROUND OF THE INVENTION

Field of the Invention

The present disclosure relates to an ink jet printing method.

Description of the Related Art

In recent years, ink jet printing apparatuses have become widely used when outputting advertisements and exhibits using print media such as paper and resin films. For example, in order to depict clear color images even on transparent print media, not only black and basic color inks (hereinafter, these inks may be collectively referred to as color inks) but also a white ink are used in combination. Specifically, a white ink is applied in advance to an area of a transparent print medium including a region where an image will be printed to perform background color treatment, and color inks are applied thereon. Alternatively, a printing method in which inks are applied in the reverse order (so-called back print) is performed.

As a colorant of a white ink, titanium oxide is widely used because it is low cost and also has excellent characteristics that are required in white inks, such as whiteness and concealability. However, titanium oxide has a problem of easily precipitating. Accordingly, from the viewpoint of suppressing precipitation of titanium oxide in a white ink, methods for improving dispersion stability by surface treatment of titanium oxide have been investigated. For example, PCT Japanese Translation Patent Publication No. 2017-521348 proposes a method for manufacture a dry titanium dioxide product in which part of a silane coupling agent is covalent-bonded to the surface of a titanium oxide particle by surface-treating titanium oxide with silica and then further performing surface treatment with the silane coupling agent and drying.

International Publication No. WO 2018/190848 proposes an ink containing titanium oxide surface-treated with alumina, a monovalent metal salt, and an alumina fine particle.

That is, in PCT Japanese Translation Patent Publication No. 2017-521348 and International Publication No. WO 2018/190848, stable discharge of a white ink and suppression of occurrence of image unevenness in a printed image have been tried by using a white ink in which precipitation of titanium oxide is suppressed.

The present inventors considered, as a method for achieving stable discharge of inks in an ink jet printing method using inks such as a white ink containing titanium oxide which easily precipitates, using a titanium oxide particle having high redispersibility, not constituting inks such that precipitation of titanium oxide is suppressed. In addition, the present inventors considered configuring a liquid discharge head such that the particle is redispersed even if precipitated.

Accordingly, the present disclosure provides an ink jet printing method in which the redispersibility of inks containing titanium oxide is enhanced and discharge stability of inks is improved.

SUMMARY OF THE INVENTION

The present disclosure for solving the above problem is an ink jet printing method for discharging an ink from a liquid discharge head, wherein the ink contains titanium oxide having a precipitation velocity of $1.0\times10^{-11}$ m/s or more based on a Stokes equation in the ink; the liquid discharge head includes a discharge port for discharging the ink, a pressure chamber for supplying the ink to the discharge port, an energy-generating element for generating energy for discharging the ink, an upstream flow channel for supplying a liquid to the pressure chamber, a downstream flow channel communicating with the pressure chamber, and a pump communicating with the upstream flow channel and the downstream flow channel and forming a circulation path in which the ink circulates in an order of the upstream flow channel, the pressure chamber, the downstream flow channel, and the upstream flow channel; and a ratio of a flow rate Q of the ink in the circulation path to a maximum cross-sectional area S of the circulation path, Q/S [m/s], is higher than the precipitation velocity.

Further features of the present invention will become apparent from the following description of exemplary embodiments with reference to the attached drawings.

DESCRIPTION OF THE EMBODIMENTS

Ink Jet Printing Method

The ink jet printing method of the present disclosure is a method for printing an image on a print medium by discharging an ink described later from a printing head of an ink jet system.

The print medium is not particularly limited, and a transparent or colored print medium can be used. The print medium may be a poorly absorbable medium (non-absorbable medium) that has low liquid absorbency, such as a resin film. The application of an ink to a unit region of a print medium may be multipass printing that performs relative scan of the printing head and the print medium multiple times. In particular, application of a white ink and application of a color ink to a unit region may be performed by different relative scans. Consequently, the time until the inks come into contact with each other becomes longer, which tends to suppress mixing thereof. The unit region can be set as an arbitrary region such as one pixel or one band.

The present inventors have first investigated methods for enhancing redispersibility when an ink containing titanium oxide has precipitated. As a result of studies by the present inventors, it was found that in order to enhance the redispersibility of an ink, it is necessary that the precipitation velocity (terminal velocity in precipitation) based on the Stokes equation is $1.0\times10^{-11}$ m/s or more. The precipitation velocity based on the Stokes equation means the velocity when the power of resistance and buoyancy exerting upward forces on a particle are balanced with the gravity exerting a downward force on the particle so that the particle moves at a constant velocity.

However, when such an ink with high redispersibility is used, titanium oxide itself in the ink tends to precipitate. Accordingly, if the flow rate of an ink flow that is generated by circulation is higher than the precipitation velocity of the ink, the redispersion of the ink is promoted. In order to realize stable discharge through a discharge port 13, it is desirable that an ink in which a titanium oxide particle is sufficiently dispersed flows into a pressure chamber. Accordingly, in the present disclosure, the liquid discharge head has a mechanism for circulating an ink in the circulation path in the head, and an ink with a uniform pigment concentration is allowed to flow into a pressure chamber by promoting redispersion by the circulation flow with respect to the ink in the circulation path to improve the discharge stability of the ink.

Figure 5:
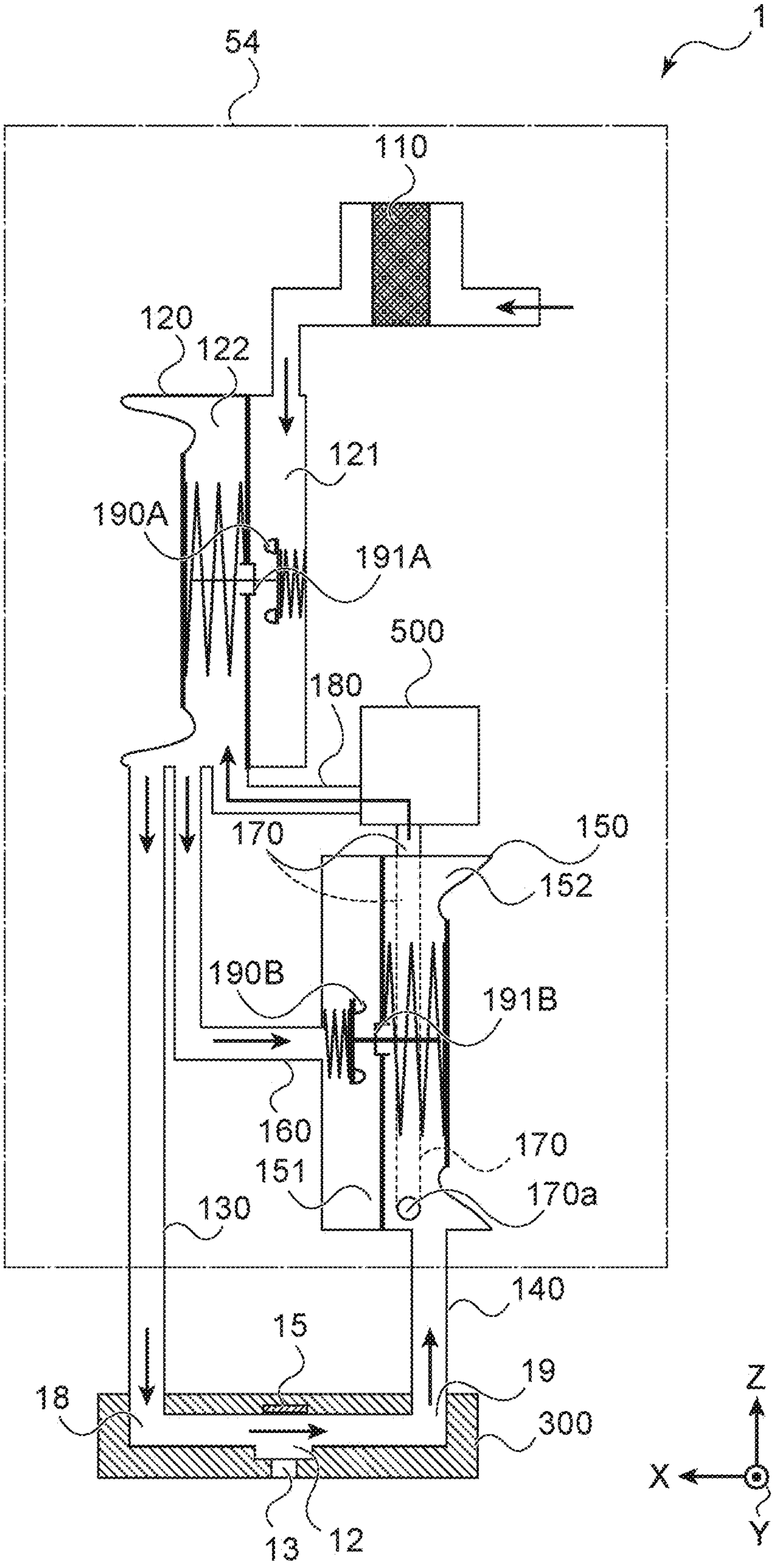
FIG. 5 is a vertical sectional view illustrating a circulation path.

The circulation of an ink in the liquid discharge head will be described with reference to FIG. 5. FIG. 5 is a cross-sectional view illustrating the vicinity of a discharge port 13 in an example of the liquid discharge head of the present disclosure described later.

The liquid discharge head 1 shown in FIG. 5 includes a discharge port 13 for discharging a reaction liquid, a pressure chamber 12 including a discharge element 15 that generates energy for discharging the reaction liquid, and a common supply channel 18 (upstream flow channel) and a common collection channel 19 (downstream flow channel) which communicate with each other between the discharge port 13 and the discharge element 15 and in which the reaction liquid flows. The reaction liquid passes through between the discharge port 13 and the discharge element 15 and flows to the common supply channel 18 and the common collection channel 19 (in the direction of the arrow in FIG. 5). Furthermore, the liquid discharge head 1 includes a pump 500 configured so as to allow the liquid in the common collection channel 19 to flow in the common supply channel 18. Consequently, in the liquid discharge head 1, a circulation path in which an ink circulates in the order of the common supply channel 18, the pressure chamber 12, the common collection channel 19, and the common supply channel 18 is formed.

In order to promote the redispersion of titanium oxide by the flow of an ink, it is sufficient that the flow of the ink is higher than or equal to the precipitation velocity of titanium oxide particles even at the area where the flow rate is the slowest in the circulation path. It was thought that the flow rate acting on the titanium oxide particles in the ink by circulation is represented by Q/S using the circulation flow rate Q and the maximum cross-sectional area S of the circulation path. It is inferred that when the Q/S [m/s] is larger than the precipitation velocity, redispersion is promoted.

Here, the cross-sectional area in the circulation path is the area of a plane orthogonal to the direction of the liquid flow. Since an increase in the maximum cross-sectional area S increases the circulation flow rate Q necessary for redispersion of the ink, the maximum cross-sectional area is preferably 500 $mm^2$ or less and more preferably 350 $mm^2$ or less.

(1) Liquid Discharge Apparatus

Regarding the liquid discharge apparatus (ink jet printing apparatus) that can be used in the ink jet printing method of the present disclosure, a suitable embodiment of the present disclosure will now be described in detail with reference to the accompanying drawings. The present embodiment below does not limit the subject matter of the present disclosure, and not all combinations of features described in the present embodiment are essential to the solution of the present disclosure. Identical components are given the same reference numbers. In the present embodiment, an example adopting a thermal system for discharging a liquid by generating air bubbles by an electrothermal conversion element as a discharge element for discharging a liquid will be described, but the discharge element is not limited thereto. A liquid discharge head adopting a discharge system for discharging a liquid using a piezoelectric element (piezo) or another discharge system can also be applied. Furthermore, a pump, a pressure regulation device, and so on described below are also not limited to the configurations described in the and drawings.

Liquid Discharge Apparatus

Figure 1A:
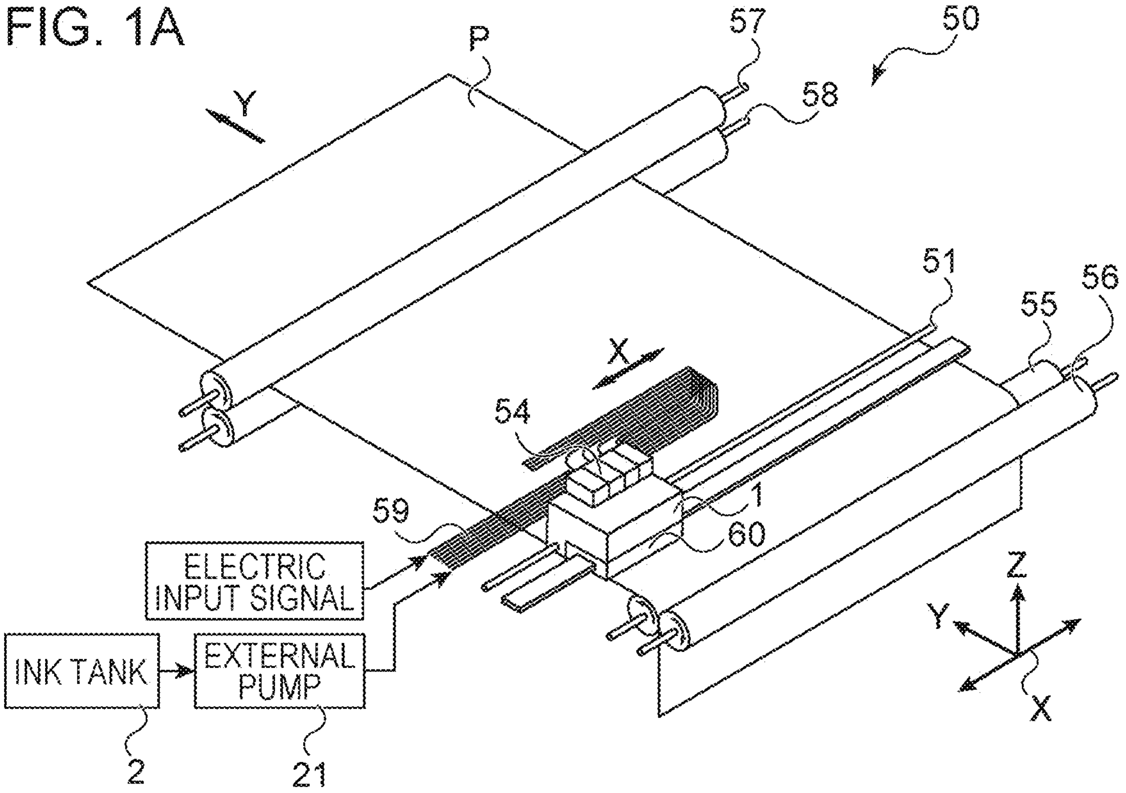
FIG. 1A is a perspective view for explaining a liquid discharge apparatus.
Figure 1B:
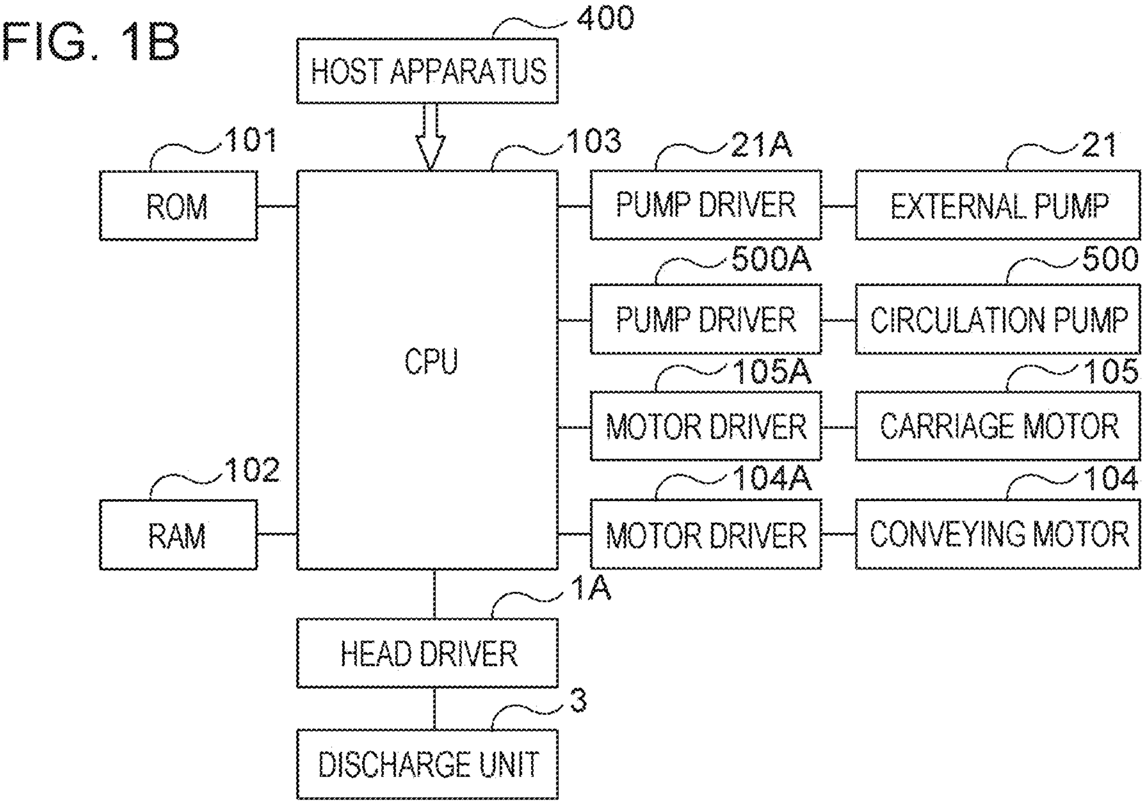
FIG. 1B is a block diagram illustrating the control system of a liquid discharge apparatus.

FIGS. 1A and 1B are diagrams for explaining a liquid discharge apparatus and are enlarged views of a liquid discharge head of a liquid discharge apparatus and the vicinity thereof. A schematic configuration of the liquid discharge apparatus 50 according to the present embodiment will be described with reference to FIGS. 1A and 1B. FIG. 1A is a perspective view schematically illustrating a liquid discharge apparatus using a liquid discharge head 1. The liquid discharge apparatus 50 of the present embodiment constitutes a serial-type ink jet printing apparatus that performs printing on a print medium P by discharging an ink as a liquid while scanning a liquid discharge head 1.

The liquid discharge head 1 is loaded on the carriage 60. The carriage 60 reciprocally moves along a guide shaft 51 in the main scanning direction (X direction). The print medium P is conveyed by conveying rollers 55, 56, 57, and 58 to a sub-scanning direction (Y direction) crossing (in this example, orthogonal to) the main scanning direction. That is, the liquid discharge head 1 is configured so as to discharge a liquid while scanning in a direction orthogonal to the conveying direction of a print medium to which the ink is applied. In each drawing referenced below, the Z direction indicates the vertical direction and crosses (in this example, orthogonal to) the X-Y plane that is defined by the X direction and the Y direction. The liquid discharge head 1 is configured to be detachable and attachable to the carriage 60 by a user.

The liquid discharge head 1 is constituted by including a circulation unit 54 and a discharge unit 3 (see FIG. 2) described later. Although a specific configuration will be described later, the discharge unit 3 is provided with a plurality of discharge ports and an energy-generating element (hereinafter, referred to as discharge element) that emits discharge energy for discharging a liquid through each discharge port.

The liquid discharge apparatus 50 is provided with an ink tank 2 (liquid storage portion) as a supply source of an ink and an external pump 21, and the ink stored in the ink tank 2 is supplied to a circulation unit 54 by a driving force of the external pump 21 through an ink supply tube 59.

The liquid discharge apparatus 50 forms a prescribed image on a print medium P by repeating print scanning in which the liquid discharge head 1 loaded on the carriage 60 performs printing by discharging an ink while moving in the main scanning direction and conveying operation of conveying the print medium P to the sub-scanning direction. The liquid discharge head 1 in the present embodiment is configured so as to be capable of discharging 4 types of inks including an ink containing titanium oxide. However, the configuration of the ink jet printing apparatus in the present disclosure is not limited to one that discharges 4 types of liquids. For example, a configuration that can discharge black (K), cyan (C), magenta (M), yellow (Y), and white (W) inks can be exemplified. In this case, full color images can be printed by these inks. However, inks that can be discharged from the liquid discharge head 1 are not limited to the above-mentioned 5 types. The present disclosure can be applied to a liquid discharge head for discharging other types of inks, a reaction liquid other than inks, or the like. That is, the type and the number of the liquid that is discharged from the liquid discharge head are not limited.

The liquid discharge apparatus 50 is provided with a cap member (not shown) that can cover the discharge port surface of the liquid discharge head where the discharge port is formed at a position deviated from the conveying path of a print medium P in the X direction. The cap member covers the discharge port surface of the liquid discharge head 1 during non-print operation and is used for drying prevention and protection of the discharge port, ink suction operation through the discharge port, and so on.

The liquid discharge head 1 shown in FIG. 1A is an example in which 4 circulation units 54 corresponding to 4 types of inks are provided to a liquid discharge head 1, and it is sufficient as long as circulation units 54 according to the types of liquids to be discharged are provided. A plurality of circulation units 54 for one type of a liquid may be provided. That is, the liquid discharge head 1 can be configured so as to include one or more circulation units. The configuration may be for circulating only at least one ink containing titanium oxide, not all 4 types of inks is circulated.

FIG. 1B is a block diagram illustrating a control system of the liquid discharge apparatus 50. A CPU 103 serves a function as a control means for controlling the operation of each part of the liquid discharge apparatus 50 based on the program such as a processing procedure stored in a ROM 101. A RAM 102 is used as a work area or the like when the CPU 103 executes processing. The CPU 103 receives image data from a host apparatus 400 outside the liquid discharge apparatus 50 to control a head driver 1A and controls the drive of the discharge element provided to a discharge unit 3. The CPU 103 also controls drivers of various actuators provided in the liquid discharge apparatus. For example, the CPU 103 controls, for example, a motor driver 105A of a carriage motor 105 for moving the carriage 60 and a motor driver 104A of a conveying motor 104 for conveying a print medium P. Furthermore, the CPU 103 controls, for example, a pump driver 500A that drives a circulation pump 500 described later and a pump driver 21A that drives an external pump 21. FIG. 1B shows a configuration for performing processing of image data from the host apparatus 400, but processing may be performed by the liquid discharge apparatus 50 without depending on data from the host apparatus 400.

Basic Configuration of Liquid Discharge Head

Figure 2:
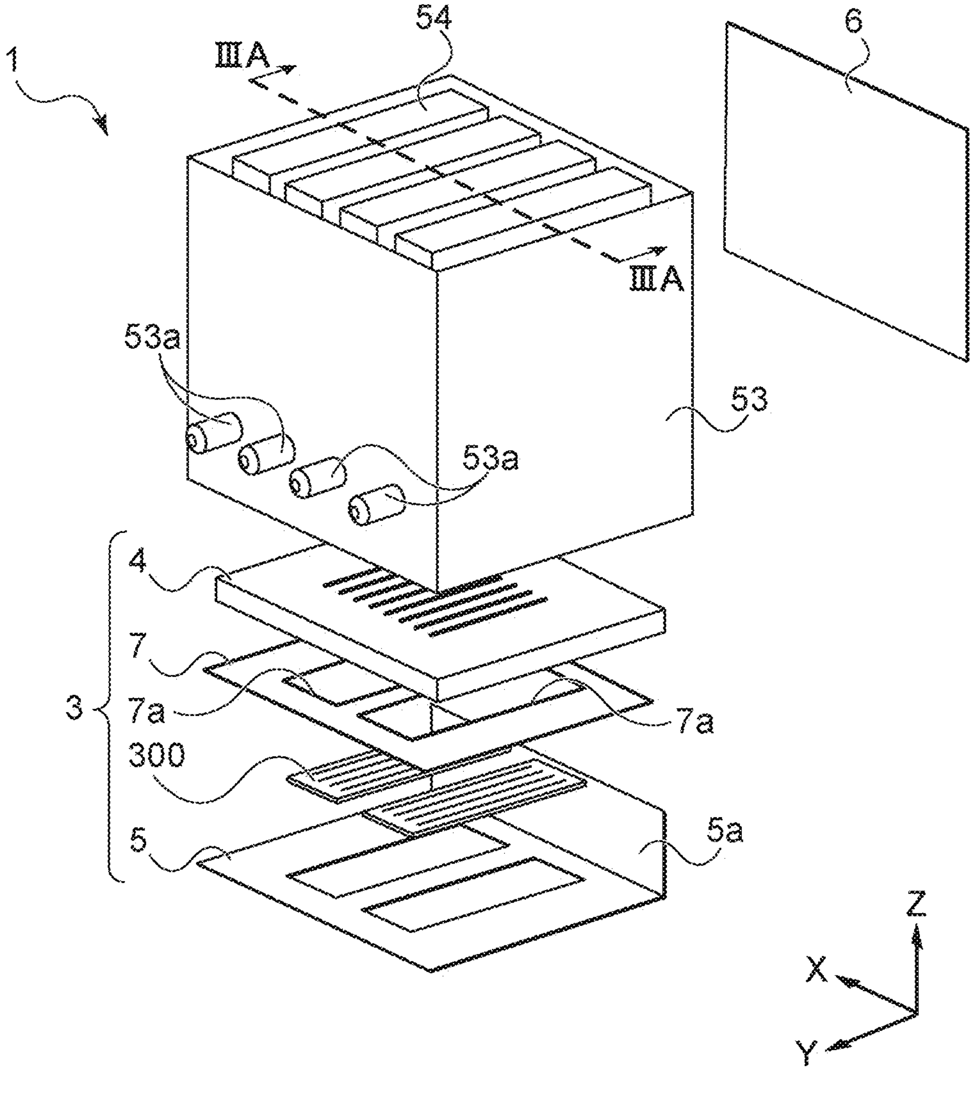
FIG. 2 is an exploded perspective view of a liquid discharge head.
Figure 3A:
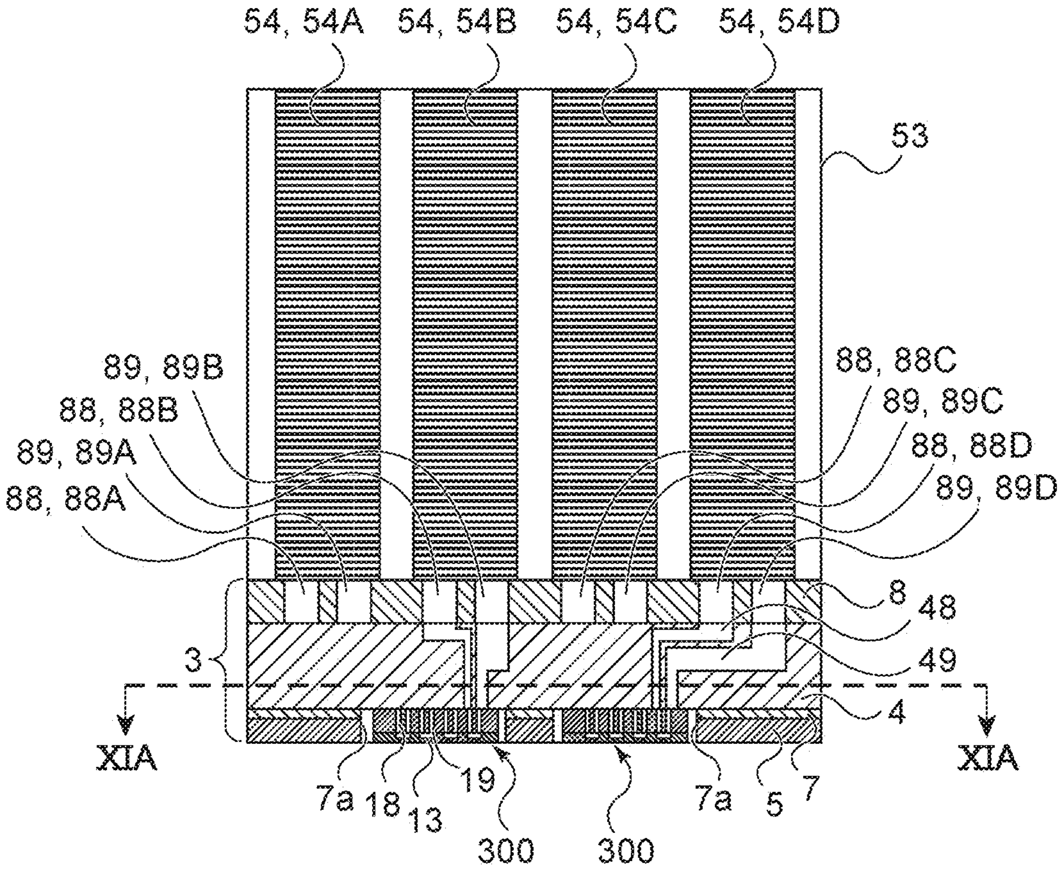
FIG. 3A shows a vertical section of a liquid discharge head.
Figure 3B:
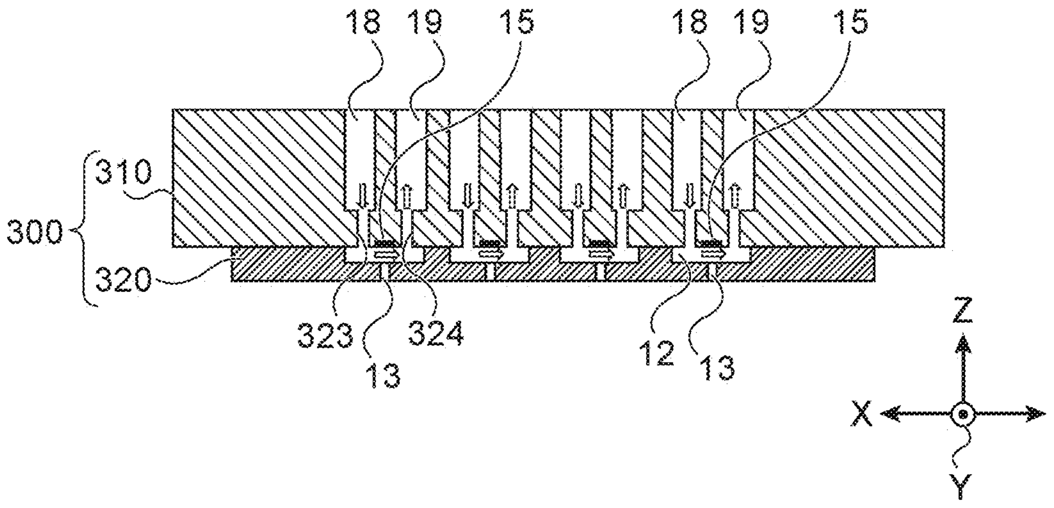
FIG. 3B is an enlarged cross-sectional view of a discharge module.

FIG. 2 is an exploded perspective view of a liquid discharge head 1 of the present embodiment. FIG. 3A is a line IIIA-IIIA cross-sectional view of the liquid discharge head 1 shown in FIG. 2. FIG. 3A is an overall vertical sectional view of the liquid discharge head 1, and FIG. 3B is an enlarged view of the discharge module 300 shown in FIG. 3A. Hereinafter, the basic configuration of the liquid discharge head 1 in the present embodiment will be described while focusing on FIGS. 2 and 3A and 3B, with appropriate reference to FIGS. 1A and 1B.

As shown in FIG. 2, the liquid discharge head 1 is constituted by including a circulation unit 54 and a discharge unit 3 for discharging an ink supplied from the circulation unit 54 onto a print medium P. The liquid discharge head 1 according to the present embodiment is fixed to and supported by the carriage 60 by a positioning means (not shown) and electric contact provided to the carriage 60 of the liquid discharge apparatus 50. The liquid discharge head 1 discharges an ink while moving together with the carriage 60 in the main scanning direction (X direction) shown in FIG. 1A to perform printing on a print medium P.

An ink supply tube 59 is provided to an external pump 21 connected to an ink tank 2 as a supply source of an ink (See FIG. 1A). The tip of this ink supply tube 59 is provided with a liquid connector (not shown). When the liquid discharge head 1 is loaded on the liquid discharge apparatus 50, the liquid connector provided to the tip of the ink supply tube 59 is airtightly connected to a liquid connector insertion port 53*a* that is an inlet port for a liquid provided to the head housing 53 of the liquid discharge head 1. Consequently, an ink supply path starting from the ink tank 2, passing through the external pump 21, and reaching the liquid discharge head 1 is formed. In the present embodiment, since 4 types of inks are used, 4 sets of the ink tank 2, the external pump 21, the ink supply tube 59, and the circulation unit 54 are provided so as to correspond to the inks, respectively, and 4 ink supply paths corresponding to the respective inks are independently formed. Thus, the liquid discharge apparatus 50 of the present embodiment includes an ink supply system to which inks are supplied from the ink tanks 2 disposed outside the liquid discharge head 1. The liquid discharge apparatus 50 of the present embodiment does not include an ink collection system for collecting the ink in the liquid discharge head 1 in the ink tank 2. Accordingly, the liquid discharge head 1 includes a liquid connector insertion port 53*a* for connecting the ink supply tube 59 of the ink tank 2, but does not include a connector insertion port for connecting a tube for collecting the ink in the liquid discharge head 1 in the ink tank 2. The liquid connector insertion port 53*a* is provided for each ink.

In FIG. 3A, 54A indicates a circulation unit for a first ink, 54B indicates a circulation unit for a second ink, 54C indicates a circulation unit for a third ink, and 54D indicates a circulation unit for a fourth ink. Among these inks (first, second, third, and fourth inks), when at least one ink contains titanium oxide, the present disclosure can be suitably used. These circulation units have approximately the same configurations, and when the circulation units are not particularly distinguished, all of them is referred to as circulation unit 54 in the present embodiment.

In FIG. 2 and FIG. 3A, the discharge unit 3 includes two discharge modules 300, a first support member 4, a second support member 7, an electric wiring member (electric wiring tape) 5, and an electric contact substrate 6. As shown in FIG. 3B, the discharge module 300 includes a silicon substrate 310 having a thickness of 0.5 to 1 mm and a plurality of discharge elements 15 disposed on one surface of the silicon substrate 310. The discharge element 15 in the present embodiment is configured of an electrothermal conversion element (heater) that generates thermal energy as the discharge energy for discharging a liquid. Electric power is supplied to each discharge element 15 through electric wiring formed on the silicon substrate 310 by film formation technique.

A discharge port forming member 320 is formed on the surface (the bottom surface in FIG. 3B) of the silicon substrate 310. In the discharge port forming member 320, a plurality of pressure chambers 12 corresponding to a plurality of discharge elements 15 and a plurality of discharge ports 13 for discharging inks are each formed by photolithographic technique. Furthermore, in the silicon substrate 310, a common supply channel 18 and a common collection channel 19 are formed. In addition, in the silicon substrate 310, a supply connection channel 323 communicating between the common supply channel 18 and each pressure chamber 12 and a collection connection channel 324 communicating between the common collection channel 19 and each pressure chamber 12 are formed. In the configuration of the present embodiment, one discharge module 300 performs discharging of 2 types of inks. That is, among the two discharge modules shown in FIG. 3A, the discharge module 300 located on the left side in the drawing performs discharge of the first and second inks, and the discharge module 300 located on the right side in the drawing performs discharge of the third and fourth inks. This combination is an example, and inks may be in any combination. A configuration in which one discharge module discharges one type of an ink may be adopted, or a configuration in which one discharge module discharge 3 or more types of inks may be adopted. Two discharge modules 300 do not need to discharge the same number of types of inks. A configuration including one discharge module 300 may be adopted, or a configuration including 3 or more discharge modules 300 may be adopted. Furthermore, in the example shown in FIGS. 3A and 3B, two discharge port arrays extending in the Y direction are formed for one type of an ink. The pressure chamber 12, the common supply channel 18, and the common collection channel 19 are formed for each of a plurality of discharge ports 13 constituting each discharge port array.

An ink supply port and an ink collection port described later are formed on the rear surface (the top surface in FIG. 3B) side of the silicon substrate 310. The ink supply port supplies an ink from an ink supply channel 48 to a plurality of common supply channels 18, and the ink collection port collects an ink from a plurality of common collection channels 19 in an ink collection channel 49.

The ink supply port and ink collection port referred herein indicate openings for supply and collection of inks during ink circulation in the forward direction described later. That is, in ink circulation in the forward direction, an ink is supplied from the ink supply port to each common supply channel 18, and an ink is collected from each common collection channel 19 to the ink collection port. However, ink circulation in which an ink flows in the reverse direction may also be performed. In this case, an ink is supplied from the ink collection port described above to the common collection channel 19, and an ink is collected from the common supply channel 18 to the ink supply port.

As shown in FIG. 3A, the rear surface (the top surface in FIG. 3A) of the discharge module 300 is adhesion-fixed to one surface (the bottom surface in FIG. 3A) of the first support member 4.

The first support member 4 is formed with an ink supply channel 48 and an ink collection channel 49 passing through from one surface to the other surface thereof. One opening of the ink supply channel 48 communicates with the above-described ink supply port of the silicon substrate 310, and the one opening of the ink collection channel 49 communicates with the above-described ink collection port of the silicon substrate 310. The ink supply channel 48 and the ink collection channel 49 are provided independently for each type of inks.

A second support member 7 having openings 7*a* (see FIG. 2) for allowing the discharge modules 300 to insert therein is adhesion-fixed to one surface (the top surface in FIG. 3A) of the first support member 4.

The second support member 7 holds an electric wiring member 5 that is electrically connected to the discharge module 300. The electric wiring member 5 is a member for applying an electric signal for discharging an ink to the discharge module 300. The electrical connection portion between the discharge module 300 and the electric wiring member 5 is sealed with a sealing material (not shown) and is protected from corrosion due to an ink and external impact.

An electric contact substrate 6 is thermocompression bonded to the end portion 5*a* (see FIG. 2) of the electric wiring member 5 using an anisotropic conducting film (not shown) to electrically connecting between the electric wiring member 5 and the electric contact substrate 6. The electric contact substrate 6 includes an external-signal input terminal (not shown) for receiving an electric signal from the liquid discharge apparatus 50.

Furthermore, a joint member 8 (FIG. 3A) is provided between the first support member 4 and the circulation unit 54. The joint member 8 is formed with a supply port 88 and a collection port 89 for each type of inks. The supply port 88 and the collection port 89 communicate between the ink supply channel 48 and the ink collection channel 49 of the first support member 4 and a flow channel formed in the circulation unit 54. In FIG. 3A, the supply port 88A and the collection port 89A correspond to a first ink, and the supply port 88B and the collection port 89B correspond to a second ink. The supply port 88C and the collection port 89C correspond to a third ink, and the supply port 88D and the collection port 89D correspond to a fourth reaction liquid.

The opening at one end portion of each of the ink supply channel 48 and the ink collection channel 49 of the first support member 4 has a small opening area adjusted to the ink supply port and the ink collection port in the silicon substrate 310. In contrast, the opening of the other end portion of each of the ink supply channel 48 and the ink collection channel 49 of the first support member 4 has a shape with an enlarged opening area that is the same as the large opening area of the joint member 8 formed to adjust the flow channel of the circulation unit 54. In such a configuration, it is possible to suppress an increase in the flow channel resistance to the ink collected from each collection channel. However, the shapes of the openings of one end portion and the other end portion of each of the ink supply channel 48 and the ink collection channel 49 are not limited to the above examples.

In the liquid discharge head 1 having the above configuration, the ink supplied to the circulation unit 54 passes through the supply port 88 of the joint member 8 and the ink supply channel 48 of the first support member 4 and flows into a common supply channel 18 through the ink supply port of the discharge module 300. Subsequently, the ink flows into a pressure chamber 12 from the common supply channel 18 through the supply connection channel 323, and part of the ink flowed into the pressure chamber is discharged from a discharge port 13 by the drive of a discharge element 15. The remaining ink that was not discharged flows out from the pressure chamber 12, passes through the collection connection channel 324 and the common collection channel 19, and flows into the ink collection channel 49 of the first support member 4 through the ink collection port. The ink flowed into the ink collection channel 49 then flows into a circulation unit 54 through the collection port 89 of the joint member 8 and is collected.

Component of Circulation Unit

Figure 4:
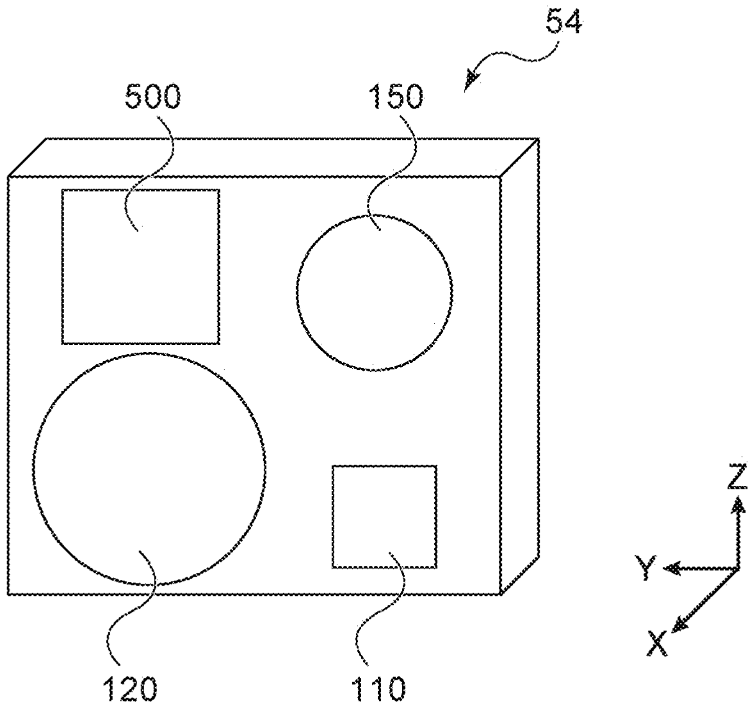
FIG. 4 is an external appearance schematic view of a circulation unit.
Figure 6:
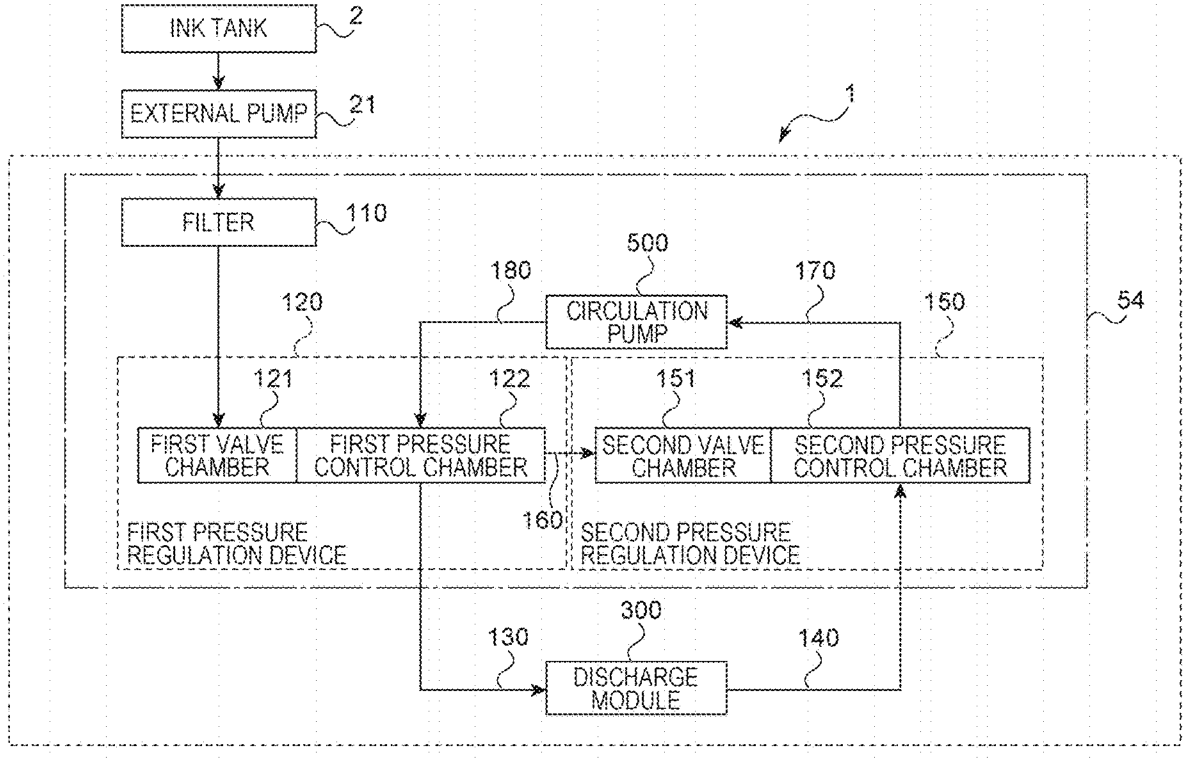
FIG. 6 is a block diagram schematically illustrating the circulation path.

FIG. 4 is an external appearance schematic view of one circulation unit 54 corresponding to one type of an ink that is applied to the printing apparatus of the present embodiment. The circulation unit 54 may include, in addition to the circulation pump 500, a filter 110, a first pressure regulation device 120, and a second pressure regulation device 150. These components are connected to each flow channel as shown in FIGS. 5 and 6 and constitute a circulation path that performs supply and collection of an ink for the discharge module 300 in the liquid discharge head 1.

Circulation Path in Liquid Discharge Head

FIG. 5 is a vertical sectional view schematically illustrating a circulation path, for one type of an ink (an ink of one color), constituted in the liquid discharge head 1. In order to more clearly explain the circulation path, the relative position of each component (such as the first pressure regulation device 120, the second pressure regulation device 150, and the circulation pump 500) in FIG. 5 is simplified. Accordingly, the relative position of each component is different from the configuration in FIG. 19 described later. FIG. 6 is a block diagram schematically illustrating the circulation path shown in FIG. 5. As shown in FIGS. 5 and 6, the first pressure regulation device 120 includes a first valve chamber 121 and a first pressure control chamber 122. The second pressure regulation device 150 includes a second valve chamber 151 and a second pressure control chamber 152. The first pressure regulation device 120 is configured such that the control pressure is relatively higher than that of the second pressure regulation device 150. In the present embodiment, circulation within a certain pressure range is realized in the circulation path by using these two pressure regulation devices 120, 150.

It is configured such that an ink flows in the pressure chamber 12 (discharge element 15) at a flow rate according to the difference between the pressures in the first pressure regulation device 120 and the second pressure regulation device 150. The circulation path in the liquid discharge head 1 and the ink flow in the circulation path will now be described with reference to FIGS. 5 and 6. The arrows in each drawing indicates the direction in which an ink flows.

The connection status of each component in the liquid discharge head 1 will be described.

An external pump 21 that sends the ink stored in an ink tank 2 (FIG. 6) disposed outside the liquid discharge head 1 to the liquid discharge head 1 is connected to a circulation unit 54 through the ink supply tube 59 (FIG. 1). The ink flow channel (inlet flow channel) located upstream of the circulation unit 54 is provided with a filter 110. The ink supply path (inlet flow channel) located downstream of the filter 110 is connected to the first valve chamber 121 of the first pressure regulation device 120. The first valve chamber 121 communicates with the first pressure control chamber 122 through a communication port 191A that can be opened and closed by the valve 190A shown in FIG. 5. The inlet flow channel is a flow channel flowing into the liquid discharge head 1 for supplying the liquid in the ink tank 2 disposed outside the liquid discharge head 1 to the pressure chamber 12.

The first pressure control chamber 122 is connected to a supply channel 130, a bypass flow channel 160, and a pump outlet channel 180 of the circulation pump 500. The supply channel 130 is connected to the common supply channel 18 through the above-described ink supply port provided to the discharge module 300. The bypass flow channel 160 is connected to a second valve chamber 151 provided in the second pressure regulation device 150. The second valve chamber 151 communicates with a second pressure control chamber 152 through a communication port 191B that is opened and closed by a valve 190B shown in FIG. 5. FIGS. 5 and 6 show an example in which one end of the bypass flow channel 160 is connected to the first pressure control chamber 122 of the first pressure regulation device 120, and the other end of the bypass flow channel 160 is connected to the second valve chamber 151 of the second pressure regulation device 150. One end of the bypass flow channel 160 may be connected to the supply channel 130, and the other end of the bypass flow channel may be connected to the second valve chamber 151.

The second pressure control chamber 152 is connected to a collection channel 140. The collection channel 140 is connected to a common collection channel 19 through the above-described ink collection port provided in the discharge module 300. Furthermore, the second pressure control chamber 152 is connected to the circulation pump 500 through a pump inlet channel 170. In FIG. 5, 170*a* indicates the inlet port of the pump inlet channel 170.

Subsequently, the ink flow in the liquid discharge head 1 having the above-described configuration will be described. As shown in FIG. 6, the ink stored in the ink tank 2 pressurized by the external pump 21 disposed in the liquid discharge apparatus 50 and supplied to the circulation unit 54 of the liquid discharge head 1 as a positive pressure ink flow.

The ink supplied to the circulation unit 54 passes through a filter 110 to remove foreign substances such as dust and air bubbles and then flows into a first valve chamber 121 provided in the first pressure regulation device 120. Although the pressure of the ink is decreased by pressure loss when passing through the filter 110, the ink pressure at this stage is in a positive pressure state. Subsequently, when the valve 190A is in the open state, the ink flowed into the first valve chamber 121 passes through the communication port 191A and flows into the first pressure control chamber 122. The ink flowed into the first pressure control chamber 122 switches from the positive pressure state to a negative pressure state by the pressure loss when passing through the communication port 191A.

The ink flow in the circulation path will be then described. The circulation pump 500 operates to send the ink sucked from the pump inlet channel 170 on the upstream side to the pump outlet channel 180 on the downstream side. Accordingly, the ink supplied to the first pressure control chamber 122 flows into the supply channel 130 and the bypass flow channel 160 together with the ink sent from the pump outlet channel 180 by driving the pump. Although the details will be described later, in the present embodiment, as a circulation pump that can send a liquid, a piezoelectric diaphragm pump using a piezoelectric element attached to a diaphragm as the driving source is used. The piezoelectric diaphragm pump is a pump that sends liquid by applying a driving voltage to the piezoelectric element to change the volume of the pump chamber and thereby alternately moving two check valves by pressure variation.

The ink flowed into the supply channel 130 passes through the common supply channel 18 and flows into the pressure chamber 12 through the ink supply port of the discharge module 300, and part of the ink is discharged from the discharge port 13 by drive (heat generation) of the discharge element 15. The remaining ink that was not used in discharging flows in the pressure chamber 12, passes through the common collection channel 19, and then flows into the collection channel 140 connected to the discharge module 300. The ink flowed into the collection channel 140 flows into the second pressure control chamber 152 of the second pressure regulation device 150.

In contrast, the ink flowed into the bypass flow channel 160 from the first pressure control chamber 122 flows into a second valve chamber 151, then passes through the communication port 191B, and flows into the second pressure control chamber 152. The ink flowed into the second pressure control chamber 152 through the bypass flow channel 160 and the ink collected from the collection channel 140 are sucked in the circulation pump 500 through the pump inlet channel 170 by the drive of the circulation pump 500. The ink sucked in the circulation pump 500 is sent to the pump outlet channel 180 and flows into the first pressure control chamber 122 again. After that, the ink flowed into the second pressure control chamber 152 from the first pressure control chamber 122 through the supply channel 130 and then through the discharge module 300 and the ink flowed into the second pressure control chamber 152 through the bypass flow channel 160 flow into the circulation pump 500. The inks are then sent from the circulation pump 500 to the first pressure control chamber 122. Thus, circulation of an ink in a circulation path is performed.

As described above, in the present embodiment, it is possible to circulate a liquid along a circulation path formed in the liquid discharge head 1 by the circulation pump 500. Accordingly, it is possible to suppress an increase in the viscosity of the ink and accumulation of precipitation components of the colorant ink in the discharge module 300, and it is possible to maintain the fluidity of an ink in the discharge module 300 and the good status of the discharge characteristics in the discharge port.

Since the circulation path in the present embodiment adopts a configuration completed within the liquid discharge head 1, the length of the circulation path can be significantly shortened compared when an ink is circulated between an ink tank 2 disposed outside a liquid discharge head and the liquid discharge head 1. Consequently, the circulation of an ink can be performed with a small size circulation pump such as a piezoelectric pump. In particular, in the present disclosure, since reciprocating movement of the liquid discharge head suppresses precipitation of particles in the ink and promotes redispersion of the ink, the dispersibility of the ink is easily maintained even with a small circulation pump.

Furthermore, the connection channel of the liquid discharge head 1 and the ink tank 2 is configured so as to include only a flow channel for supplying an ink. That is, a configuration that does not require a flow channel for collecting an ink from the liquid discharge head 1 to the ink tank 2 is adopted. Consequently, it is sufficient to provide only a tube for ink supply in connection between the ink tank 2 and the liquid discharge head 1, and a tube for ink collection is not required. Accordingly, the inside of the liquid discharge apparatus 50 can have a simple configuration in which the number of tubes is decreased, and downsizing of the whole apparatus can be achieved. Furthermore, the decrease in the number of tubes can reduce the pressure variation of an ink caused by oscillation of the tubes due to main scanning of the liquid discharge head 1. The oscillation of the tubes during main scanning of the liquid discharge head 1 becomes a driving load of a carriage motor that drives the carriage 60. Consequently, the decrease in the number of tubes reduces the driving load of the carriage motor, and it becomes possible to simplify the main scanning mechanism including the carriage motor. Furthermore, since there is no need to collect an ink from the liquid discharge head to the ink tank, it is also possible to decrease the size of the external pump 21. Thus, according to the present embodiment, while configuring such that a liquid is allowed to circulate in the liquid discharge apparatus 50, downsizing and cost reduction can be realized.

The flow rate (circulation flow rate) for circulating reaction liquid is preferably 1.0 mL/min or more and 10.0 mL/min or less, more preferably 2.0 mL/min or more and 10.0 mL/min or less, and further preferably 2.0 mL/min or more and 5.0 mL/min or less.

Pressure Regulation Device

Figure 7A:
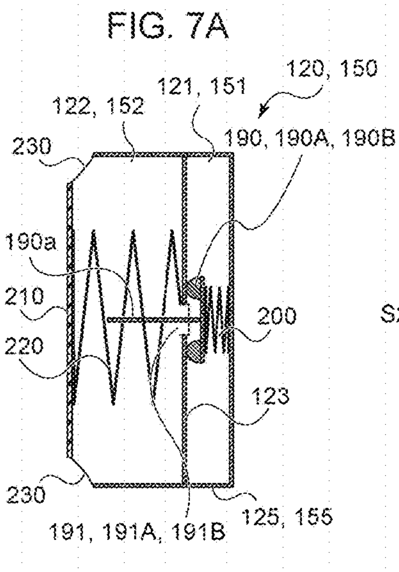
FIGS. 7A to 7C are cross-sectional views illustrating an example of a pressure regulation device.
Figure 7B:
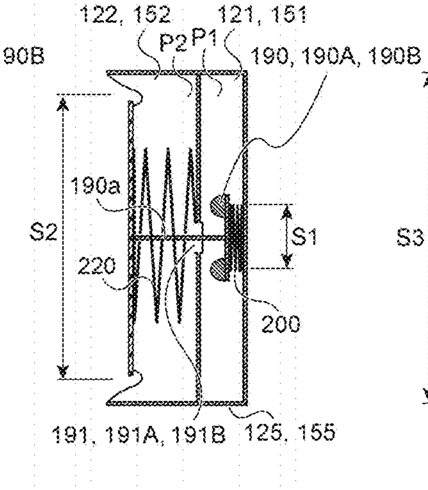
Figure 7C:
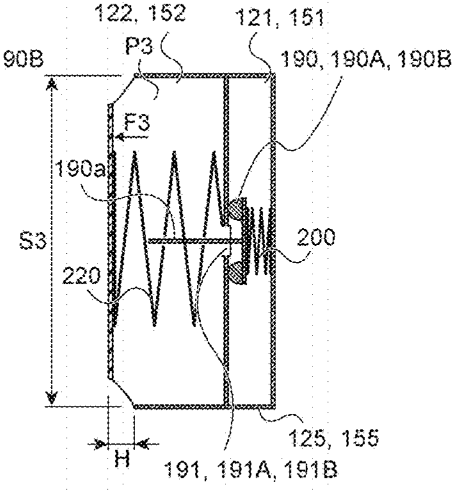

FIGS. 7A, 7B, and 7C are diagrams showing examples of the pressure regulation device. With reference to FIGS. 7A to 7C, the configurations and functions of pressure regulation devices (the first pressure regulation device 120 and the second pressure regulation device 150) built in the above-described liquid discharge head 1 will be described in more detail. The first pressure regulation device 120 and the second pressure regulation device 150 have substantially the same configuration. Accordingly, in the following, the first pressure regulation device 120 will be described as an example, and regarding the second pressure regulation device 150, only the reference numerals of the parts corresponding to the first pressure regulation device are shown in FIGS. 7A to 7C. In the second pressure regulation device 150, the first valve chamber 121 that will be described below is replaced by the second valve chamber 151, and the first pressure control chamber 122 is replaced by the second pressure control chamber 152.

The first pressure regulation device 120 includes a first valve chamber 121 and a first pressure control chamber 122 formed in a cylindrical housing 125. The first valve chamber 121 and the first pressure control chamber 122 are separated from each other with a partition 123 disposed in the cylindrical housing 125. However, the first valve chamber 121 communicates with the first pressure control chamber 122 through a communication port 191 formed in the partition 123. The first valve chamber 121 is provided with a valve 190 that switches communication and shutdown between the first valve chamber 121 and the first pressure control chamber 122 at the communication port 191. The valve 190 is held by a valve spring 200 at a position facing the communication port 191 and is configured to be brought into close contact with the partition 123 by the biasing force of the valve spring 200. When the valve 190 is in close contact with the partition 123, the ink flow through the communication port 191 is disconnected. In order to enhance the closeness with the partition 123, the contact portion of the valve 190 with the partition 123 may be formed of an elastic material. A valve shaft 190*a* that is inserted in the communication port 191 is provided in a protruding state at the central portion of the valve 190. The valve 190 is separated from the partition 123 by pressing this valve shaft 190*a* against the biasing force of the valve spring 200, and it becomes possible that an ink flows in the communication port 191. Hereinafter, a state in which an ink flows through the communication port 191 is blocked by the valve 190 is referred to as a "closed state", and a state in which an ink flows through the communication port 191 is referred to as an "open state".

The opening portion of the cylindrical housing 125 is occluded by a flexible member 230 and a pressing plate 210. The flexible member 230, the pressing plate 210, the surrounding wall of the housing 125, and the partition 123 form the first pressure control chamber 122. The pressing plate 210 is configured so as to be displaceable as the flexible member 230 is displaced. The materials of the pressing plate 210 and the flexible member 230 are not particularly limited. For example, the pressing plate 210 can be configured of a resin molded product, and the flexible member 230 can be configured of a resin film. In this case, the pressing plate 210 can be fixed to the flexible member 230 by thermal welding.

A pressure adjusting spring 220 (biasing member) is disposed between the pressing plate 210 and the partition 123. The pressing plate 210 and the flexible member 230 are energized by the biasing force of the pressure adjusting spring 220 in the direction in which the inner volume of the first pressure control chamber 122 is increased as shown in FIG. 7A.

When the pressure in the first pressure control chamber 122 is decreased, the pressing plate 210 and the flexible member 230 displace so that the inner volume of the first pressure control chamber 122 is decreased against the pressure of the pressure adjusting spring 220. When the inner volume of the first pressure control chamber 122 is decreased to a certain volume, the pressing plate 210 abuts against the valve shaft 190*a* of the valve 190. Subsequently, when the inner volume of the first pressure control chamber 122 is decreased, the valve 190 moves together with the valve shaft 190*a* against the biasing force of the valve spring 200 and is separated from the partition 123. Consequently, the communication port 191 becomes the open state (the state shown in FIG. 7B).

In the present embodiment, the connection in the circulation path is set such that the pressure of the first valve chamber 121 when the communication port 191 is in the open state is higher than the pressure of the first pressure control chamber 122.

Consequently, when the communication port 191 becomes the open state, an ink is flows into the first pressure control chamber 122 from the first valve chamber 121. This ink flow displaces the flexible member 230 and the pressing plate 210 such that the inner volume of the first pressure control chamber 122 is increased. As a result, the pressing plate 210 is separated from the valve shaft 190*a* of the valve 190, the valve 190 becomes in close contact with the partition 123 by the biasing force of the valve spring 200, and the communication port 191 becomes the closed state (the state shown in FIG. 7C).

Thus, in the first pressure regulation device 120 in the present embodiment, when the pressure in the first pressure control chamber 122 is decreased to a certain pressure or less (for example, when the negative pressure becomes stronger), the ink flows into the first pressure control chamber 122 from the first valve chamber 121 through the communication port 191. Consequently, it is configured such that the pressure of the first pressure control chamber 122 does not decrease further. Accordingly, the first pressure control chamber 122 is controlled so as to maintain the pressure within a certain range.

The pressure of the first pressure control chamber 122 will be then described in more detail.

As described above, it is considered an open state of the communication port 191 (the state shown in FIG. 7B) in which the flexible member 230 and the pressing plate 210 are displaced in response to the pressure of the first pressure control chamber 122 and the pressing plate 210 abuts against the valve shaft 190*a*. On this occasion, the relation of the force acting on the pressing plate 210 is represented by the following equation 1:

$$P2 \times S2 + F2 + (P1 - P2) \times S1 + F1 = 0. \qquad \text{Equation 1}$$

Furthermore, organization of the equation 1 regarding P2 gives the following:

$$P2 = -(F1 + F2 + P1 \times S1)/(S2 - S1). \qquad \text{Equation 2}$$

P1: pressure of first valve chamber 121 (gauge pressure);
P2: pressure of first pressure control chamber 122 (gauge pressure);
F1: spring force of valve spring 200;
F2: spring force of pressure adjusting spring 220;
S1: pressure receiving area of valve 190; and
S2: pressure receiving area of pressing plate 210.

Here, the direction in which the spring force F1 of the valve spring 200 and the spring force F2 of the pressure adjusting spring 220 press the valve 190 and the pressing plate 210 (the left direction in FIGS. 7A to 7C) are defined as positive. It is configured such that the pressure P1 in the first valve chamber 121 and the pressure P2 in the first pressure control chamber 122 have a relationship of P1≥P2.

The pressure P2 in the first pressure control chamber 122 when the communication port 191 becomes the open state is determined by the equation 2, and it is configured such that when the communication port 191 becomes the open state, a relationship of P1≥P2 is established. Consequently, an ink flows into the first pressure control chamber 122 from the first valve chamber 121. As a result, the pressure P2 in the first pressure control chamber 122 does not decrease any more, and the pressure P2 is maintained within a certain range.

In contrast, as shown in FIG. 7C, when the pressing plate 210 is in non-contact with the valve shaft 190*a* and the communication port 191 becomes the closed state, the relation of the force acting on the force pressing plate 210 is represented by the equation 3:

$$P3 \times S3 + F3 = 0. \qquad \text{Equation 3}$$

Here, organization of the equation 3 regarding P3 gives the following:

$$P3=-F3/S3. \quad \text{Equation 4}$$

F3: spring force of the pressure adjusting spring 220 when the pressing plate 210 and the valve shaft 190*a* are in non-contact with each other;

P3: pressure (gauge pressure) of the first pressure control chamber 122 when the pressing plate 210 and the valve shaft 190*a* are in non-contact with each other; and S3: pressure receiving area of the pressing plate 210 when the pressing plate 210 and the valve 190 are in non-contact area.

Here, FIG. 7C shows a state in which the pressing plate 210 and the flexible member 230 are displaced to the right direction in the figure up to the limit of possible displacement. The pressure P3 in the first pressure control chamber 122, the spring force F3 of the pressure adjusting spring 220, and the pressure receiving area S3 of the pressing plate 210 change according to the amount of displacement until the pressing plate 210 and the flexible member 230 are displaced to the state shown in FIG. 7C. Specifically, when the pressing plate 210 and the flexible member 230 are on the right side as shown in FIG. 7B compared to them in FIG. 7C, the pressure receiving area S3 of the pressing plate 210 is decreased, and the spring force F3 of the pressure adjusting spring 220 is increased. As a result, the pressure P3 in the first pressure control chamber 122 is decreased by the relationship of the equation 4. Accordingly, during the change from the state shown in FIG. 7B to the state shown in FIG. 7C, the pressure in the first pressure control chamber 122 gradually increases (that is, the negative pressure becomes weaker and approaches the positive pressure side) according to the equations 2 and 4. That is, the pressing plate 210 and the flexible member 230 gradually displace to the left direction from the state in which the communication port 191 is in the open state, and the pressure of the first pressure control chamber gradually increases until the inner volume of the first pressure control chamber 122 finally reaches the limit of possible displacement. That is, the negative pressure weakens.

Circulation Pump

The configuration and function of the circulation pump 500 built in the above-described liquid discharge head 1 will be then described in detail with reference to FIGS. 8A, 8B, and 9.

Figure 8A:
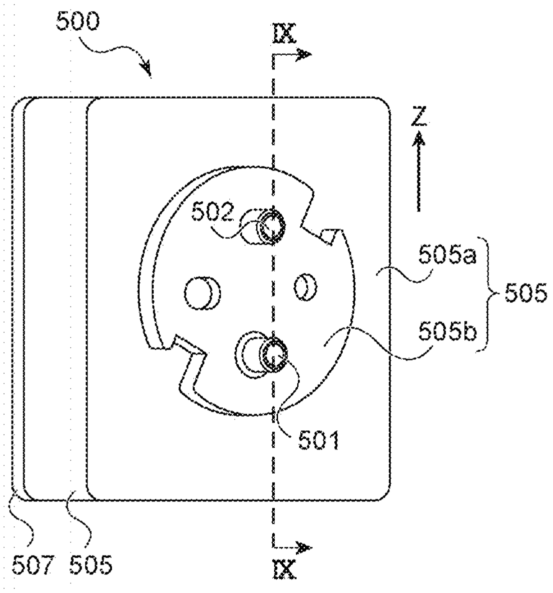
FIGS. 8A and 8B are external appearance perspective views of a circulation pump.
Figure 8B:
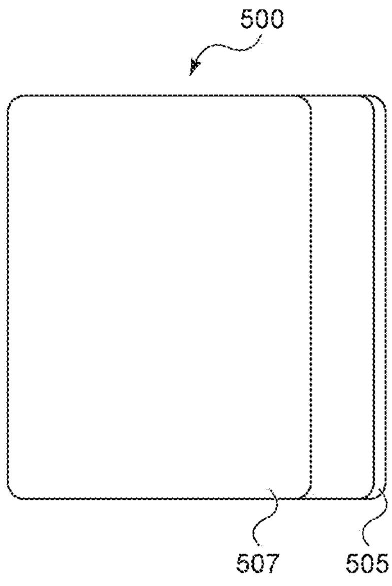

FIGS. 8A and 8B are external appearance perspective views of the circulation pump 500. FIG. 8A is an external appearance perspective view illustrating the front side of the circulation pump 500, and FIG. 8B is an external appearance perspective view illustrating the back side of the circulation pump 500.

The outer shell of the circulation pump 500 is configured of a pump housing 505 and a cover 507 fixed to the pump housing 505. The pump housing 505 is configured of a housing main body 505*a* and a flow channel connecting member 505*b* adhesion-fixed to the outer surface of the housing main body 505*a*. A pair of through holes communicating with each other is provided in each of the housing main body 505*a* and the flow channel connecting member 505*b* at two different positions. A pair of through holes provided at one position forms a pump supply hole 501, and a pair of through holes provided at the other position forms a pump discharge hole 502. The pump supply hole 501 is connected to the pump inlet channel 170 that is connected to the second pressure control chamber 152, and the pump discharge hole 502 is connected to the pump outlet channel 180 that is connected to the first pressure control chamber 122. The ink sullied from the pump supply hole 501 passes through a pump chamber 503 described later (see FIG. 9) and is discharged from the pump discharge hole 502.

Figure 9:
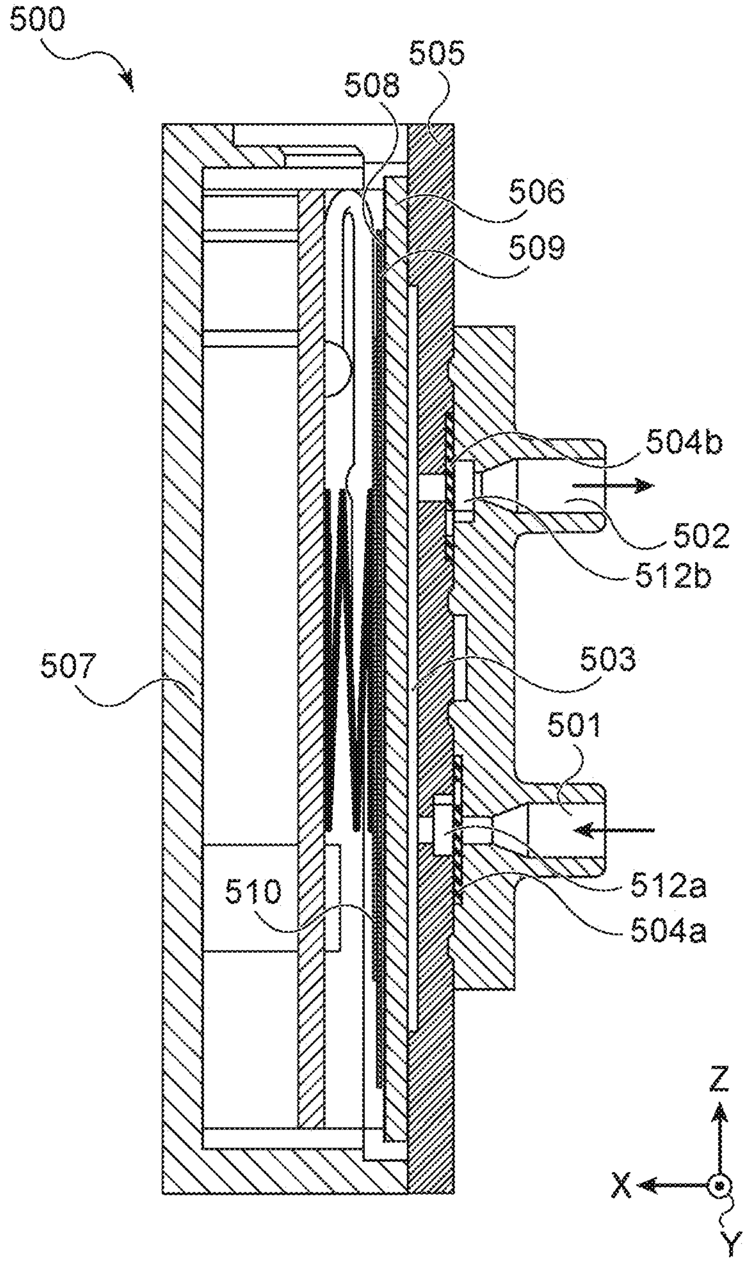
FIG. 9 is a line IX-IX cross-sectional view of the circulation pump shown in FIG. 8A.

FIG. 9 is a line IX-IX cross-sectional view of the circulation pump 500 shown in FIG. 8A. A diaphragm 506 is bonded to the inner surface of the pump housing 505, and a pump chamber 503 is formed between this diaphragm 506 and the recessed portion formed on the inner surface of the pump housing 505. The pump chamber 503 communicates with the pump supply hole 501 and the pump discharge hole 502 formed in the pump housing 505. A check valve 504*a* is provided at the middle portion of the pump supply hole 501, and a check valve 504*b* is provided at the middle portion of the pump discharge hole 502. Specifically, the check valve 504*a* is arranged such that it can move to the left in the drawing in the space 512*a* that is partially formed at the middle portion of the pump supply hole 501. The check valve 504*b* is arranged such that it can move to the right in the drawing in the space 512B that is partially formed at the middle portion of the pump discharge hole 502.

When the pressure in the pump chamber 503 is decreased by an increase in the volume of the pump chamber 503 by displacement of the diaphragm 506, the check valve 504*a* is separated from the opening of the pump supply hole 501 in the space 512*a* (that is, moves to the left in the drawing). The state becomes the open state that allows the ink in the pump supply hole 501 to flow by separating the check valve 504*a* from the opening of the pump supply hole 501 in the space 512*a*. The check valve 504*a* is brought into close contact with the wall in the periphery of the opening of the pump supply hole 501 by pressurization of the pump chamber 503 due to a decrease in the volume of the pump chamber 503 by displacement of the diaphragm 506. Consequently, the state becomes the closed state in which the flow of an ink in the pump supply hole 501 is blocked.

In contrast, the check valve 504*b* is brought into close contact with the wall in the periphery of the opening of the pump housing 505 by reducing the pressure in the pump chamber 503, and the state becomes the closed state in which the flow of an ink in the pump discharge hole 502 is blocked. When a pressure is applied to the pump chamber 503, the check valve 504*b* is separated from the opening of the pump housing 505 and moves to the space 512*b* side (that is, moves to the right in the drawing), and the ink can flow in the pump discharge hole 502.

The check valves 504*a*, 504*b* may be made of any materials that can be deformed in response to the pressure in the pump chamber 503, and can be formed of, for example, elastic materials such as EPDM and elastomers or films or thin plates of polypropylene and so on. However, the materials of the check valves are not limited thereto.

As described above, the pump chamber 503 is formed by bonding the pump housing 505 and the diaphragm 506. Accordingly, the pressure in the pump chamber 503 is changed by deformation of the diaphragm 506. For example, the diaphragm 506 is displaced to the pump housing 505 side (in the drawing, displaced to the right side) to decrease the volume of the pump chamber 503, and the pressure in the pump chamber 503 is thereby increased. Consequently, the check valve 504*b* arranged so as to face the pump discharge hole 502 becomes the open state, the ink in the pump chamber 503 is discharged. On this occasion, since the check valve 504*a* arranged so as to face the pump supply hole 501 is brought into close contact with the wall in the periphery of the pump supply hole 501, the backflow of an ink from the pump chamber 503 to the pump supply hole 501 is prevented.

In contrast, when the diaphragm 506 is displaced to a direction in which the pump chamber 503 is expanded, the pressure in the pump chamber 503 decreases. Consequently, the check valve 504*a* arranged so as to face the pump supply hole 501 becomes the open state to supply the ink to the pump chamber 503. On this occasion, the check valve 504*b* arranged in the pump discharge hole 502 is brought into close contact with the wall in the periphery of the opening formed in the pump housing 505 to occlude the opening. Consequently, the backflow of the ink from the pump discharge hole 502 to the pump chamber 503 is prevented.

Thus, in the circulation pump 500, the diaphragm 506 is deformed to change the pressure in the pump chamber 503, and thereby suction and discharge of an ink are performed. On this occasion, if bubbles permeate into the pump chamber 503, the change in the pressure in the pump chamber 503 becomes smaller due to expansion and contraction of the bubbles, even when the diaphragm 506 is displaced, to decrease the liquid feeding amount. Accordingly, the pump chamber 503 is arranged to be parallel to the gravity such that the bubbles permeated into the pump chamber 503 tend to be collected at the top of the pump chamber 503, and the pump discharge hole 502 is arranged above the center of the pump chamber 503. Consequently, it is possible to improve the ability to discharge bubbles inside the pump, and it is possible to stabilize the flow rate.

Flow of in Inside Liquid Discharge Head

Figure 10A:
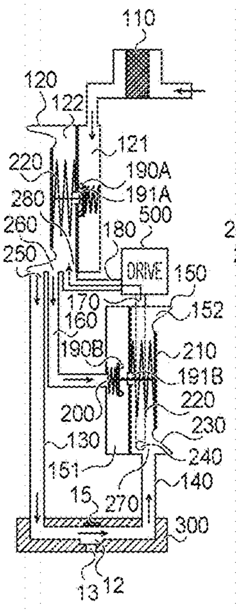
FIGS. 10A to 10E are diagrams for explaining a flow of an ink in a liquid discharge head.

FIGS. 10A to 10E are diagrams for explaining the flow of an ink in the liquid discharge head. With reference to FIGS. 10A to 10E, circulation of an ink in the liquid discharge head 1 will be described. In order to more clearly describe the ink circulation path, the relative positions of the components (such as the first pressure regulation device 120, the second pressure regulation device 150, and the circulation pump 500) in FIGS. 10A to 10E are simplified. Accordingly, the relative positions of each components are different from the configuration shown in FIG. 19 described later. FIG. 10A schematically shows the flow of an ink when printing operation is performed by discharging the ink from the discharge port 13. The arrows in the drawings indicate the ink flow. In the present embodiment, when printing operation is performed, both the external pump 21 and the circulation pump 500 start to be driven. In the state of not performing printing operation, the external pump 21 and the circulation pump 500 may be driven. The external pump 21 and the circulation pump 500 may be driven in connection with each other but may be driven separately and independently.

During printing operation, the circulation pump 500 is in the state of "ON" (driving state), and the ink flowed out from the first pressure control chamber 122 flows into the supply channel 130 and the bypass flow channel 160. The ink flowed into the supply channel 130 passes through the discharge module 300 and then flows into the collection channel 140, and is then supplied to the second pressure control chamber 152.

On the other hand, the ink flowed into the bypass flow channel 160 from the first pressure control chamber 122 flows into the second pressure control chamber 152 through the second valve chamber 151. The ink flowed into the second pressure control chamber 152 passes through the pump inlet channel 170, the circulation pump 500, and the pump outlet channel 180 and then flows into the first pressure control chamber 122 again. On this occasion, the control pressure by the first valve chamber 121 is set to be higher than the control pressure in the first pressure control chamber 122 based on the relationship of the above-described equation 2. Accordingly, the ink in the first pressure control chamber 122 is supplied to the discharge module 300 again through the supply channel 130, without flowing into the first valve chamber 121. The ink flowed into the discharge module 300 passes through the collection channel 140, the second pressure control chamber 152, the pump inlet channel 170, the circulation pump 500, and the pump outlet channel 180 and then flows into the first pressure control chamber 122 again. As described above, ink circulation that is completed within the liquid discharge head 1 is performed.

In the ink circulation above, the circulation amount (flow rate) of the ink in the discharge module 300 is determined by the differential pressure between the control pressures of the first pressure control chamber 122 and the second pressure control chamber 152. This differential pressure is set to a circulation amount that can suppress the increase in the viscosity of the ink in the vicinity of the discharge port in the discharge module 300. In the circulation unit 54 corresponded to an ink containing titanium oxide, the differential pressure is further set such that the Q/S [m/s] represented by using the circulation flow rate Q and the maximum cross-sectional area S of the circulation path is higher than the precipitation velocity of titanium oxide. An ink in the amount consumed by printing is supplied to the first pressure control chamber 122 from the ink tank 2 through the filter 110 and the first valve chamber 121. The mechanism for supplying the consumed ink will be described in detail. The ink in the circulation path is decreased by the amount of ink consumed by printing, and thereby the pressure in the first pressure control chamber is decreased. As a result, the ink in the first pressure control chamber 122 is also decreased. The decrease of the ink in the first pressure control chamber 122 causes a decrease in the inner volume of the first pressure control chamber 122. By this decrease in the inner volume of the first pressure control chamber 122, the communication port 191A becomes the open state, and the ink is supplied to the first pressure control chamber 122 from the first valve chamber 121. A pressure loss is generated in this supplied ink when the ink passes through the communication port 191A from the first valve chamber 121, and the ink flows into the first pressure control chamber 122 to switch the ink from a positive pressure state to a negative pressure state. The ink then flows into the first pressure control chamber 122 from the first valve chamber 121 to increase the pressure in the first pressure control chamber, which increases the inner volume of the first pressure control chamber, resulting in the closed state of the communication port 191A. Thus, the open state and the closed state of the communication port 191A are repeated according to the consumption of the ink. When the ink is not consumed, the communication port 191A is maintained in the closed state.

Figure 10B:
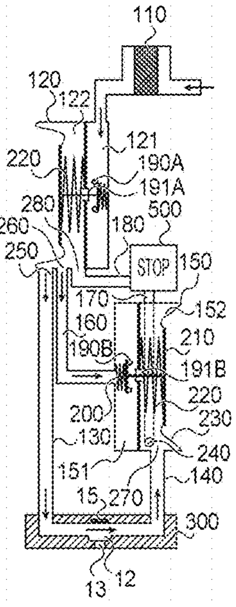

FIG. 10B schematically shows the flow of an ink immediately after the end of the printing operation and change to the state of "OFF" (stopped state) of the circulation pump 500. At the time when the printing operation ends and the circulation pump 500 is switched to "OFF", the pressure in the first pressure control chamber 122 and the pressure in the second pressure control chamber 152 are both control pressures during printing operation. Consequently, the movement of the ink occurs as shown in FIG. 10B depending on the differential pressure between the pressure of the first pressure control chamber 122 and the pressure of the second pressure control chamber 152. Specifically, an ink is supplied to the discharge module 300 from the first pressure control chamber 122 through the supply channel 130, and then a flow of the ink passing through the collection channel 140 and reaching the second pressure control chamber 152 continuously occurs. In addition, a flow of an ink from the first pressure control chamber 122 passing through the bypass flow channel 160 and the second valve chamber 151 and reaching the second pressure control chamber 152 also continuously occurs.

The ink is supplied to the first pressure control chamber 122 from the ink tank 2 through the filter 110 and the first valve chamber 121 by the amount of the ink moved from the first pressure control chamber 122 to the second pressure control chamber 152 by the above-described flows of the ink. Consequently, the inner volume of the first pressure control chamber 122 is maintained constant. From the relationship with the above-described equation 2, when the inner volume of the first pressure control chamber 122 is constant, the spring force F1 of the valve spring 200, the spring force F2 of the pressure adjusting spring 220, the pressure receiving area S1 of the valve 190, and the pressure receiving area S2 of the pressing plate 210 are maintained constant. Accordingly, the pressure in the first pressure control chamber 122 is determined in response to the change in the pressure (gauge pressure) P1 in the first valve chamber 121. Therefore, when the pressure P1 in the first valve chamber 121 does not change, the pressure P2 in the first pressure control chamber 122 is maintained at the same pressure as the control pressure during printing operation.

Figure 10C:
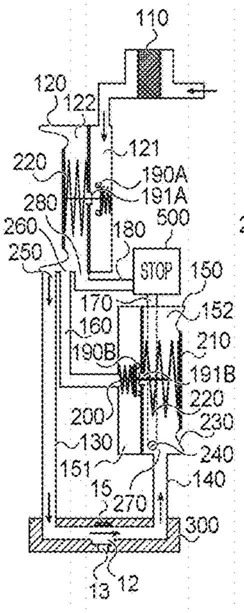
Figure 10D:
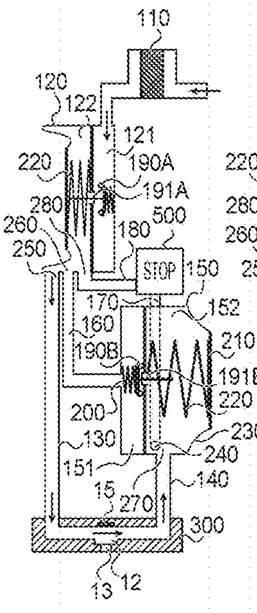

In contrast, the pressure in the second pressure control chamber 152 changes over time in response to the change in the inner volume due to the inflow of an ink from the first pressure control chamber 122. Specifically, the pressure in the second pressure control chamber 152 changes according to the equation 2 during from the state shown in FIG. 10B to the state in which the second valve chamber 151 and the second pressure control chamber 152 are not communicated with each other due to the closed state of the communication port 191 as shown in FIG. 10C. Subsequently, the pressing plate 210 and the valve shaft 190*a* are brought into non-contact with each other, and the communication port 191 becomes the closed state. As shown in FIG. 10D, the ink flows into the second pressure control chamber 152 from the collection channel 140. This ink inflow displaces the pressing plate 210*a* and the flexible member 230, and the pressure in the second pressure control chamber 152 changes, i.e., increases, according to the equation 4 until the inner volume of the second pressure control chamber 152 reaches the maximum.

When the state is changed to that shown in FIG. 10C, no flow of the ink occurs from the first pressure control chamber 122 to the second pressure control chamber 152 through the bypass flow channel 160 and the second valve chamber 151. Accordingly, only a flow of the ink that is supplied from the first pressure control chamber 122 to the discharge module 300 through the supply channel 130 and then passes through the collection channel 140 and reaches the second pressure control chamber 152 occurs. As described above, movement of an ink from the first pressure control chamber 122 to the second pressure control chamber 152 occurs in response to the difference between the pressure in the first pressure control chamber 122 and the pressure in the second pressure control chamber 152. Consequently, the movement of the ink stops when the pressure in the second pressure control chamber 152 and the pressure in the first pressure control chamber 122 become the same.

Figure 10E:
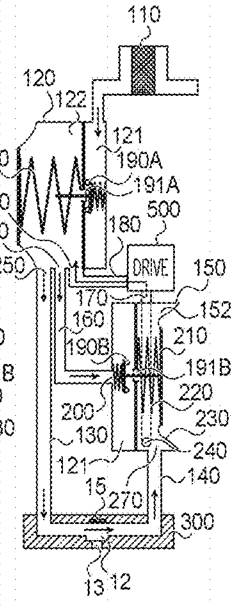

In the state in which the pressure in the second pressure control chamber 152 is equal to the pressure in the first pressure control chamber 122, the second pressure control chamber 152 is expanded to the state shown in FIG. 10D. When the second pressure control chamber 152 is expanded as shown in FIG. 10D, in the second pressure control chamber 152, a reservoir portion that can store an ink is formed. The time for transition from the stop of the circulation pump 500 to the state shown in FIG. 10D may vary depending on the shape and size of the flow channel and the properties of the ink, but is approximately 1 to 2 minutes. The ink in the reservoir portion is supplied to the first pressure control chamber 122 by the circulation pump 500 by driving the circulation pump 500 from the state in which the ink is stored in the reservoir portion shown in FIG. 10D. Consequently, as shown in FIG. 10E, the amount of the ink in the first pressure control chamber 122 is increased, and the flexible member 230 and the pressing plate 210 displace to the expansion direction. When the circulation pump 500 is continuously driven, as shown in FIG. 10A, the condition in the circulation path changes.

In the description above, although FIG. 10A is explained as an example of printing operation, circulation of an ink may be performed without printing operation as described above. Also in such a case, a flow of the ink as shown in FIGS. 10A to 10E occurs in response to operation and stopping of the circulation pump 500.

Here, when the stopped state of the circulation pump 500 is continued for a long period of time (for example, when the power source of the main body is OFF), it is inferred that the titanium oxide particles in the ink are not redispersed and precipitate. It is also inferred that the concentration and the viscosity of the ink are increased due to the evaporation of the ink from the discharge port 13 and that the negative pressure in the head is weakened due to the air penetration and invasion into the liquid discharge head housing. If printing operation is performed under these conditions, the quality of printed images may decrease. Accordingly, suction and discharge treatment for refreshing the ink in the discharge port to maintain and recover the ink discharge performance may be performed by suction and discharge of thickened ink and air bubbles together with the ink from the discharge port 13 of the liquid discharge head 1 using the above-described cap member and so on. This suction and discharge treatment sucks and discharges the precipitated ink to cancel the precipitation in the liquid discharge head.

As described above, the first pressure regulation device 120 and the second pressure regulation device 150 in the present embodiment are configured such that the flexible member 230 and the pressing plate 210 receive the pressure in the liquid discharge head 1 and displace. From the negative pressure design, a pressure receiving area with a certain size is required. Consequently, the first pressure control chamber 122 and the second pressure control chamber 152 have larger volumes compared to other parts in the circulation path and are areas where the ink easily precipitate in the liquid discharge head. In this case, it is inferred that precipitated ink (titanium oxide particles) inhibits displacement of the flexible member 230 and the pressing plate 210 and the appropriate negative pressure cannot be maintained.

Accordingly, in the circulation path, the portions where the pressure control chambers (the first pressure control chamber 122 and the second pressure control chamber 152) are communicated with other flow channels (in FIGS. 10A to 10E, 250, 260, 280, 240, and 270) may be arranged vertically below the pressure control chambers. Consequently, it is possible to effectively discharge the precipitated ink in the pressure control chambers to the outside of the liquid discharge head during the suction and discharge treatment. The ink is sucked through the discharge port 13 by the suction and discharge treatment to cause a flow of the ink toward the discharge port 13 in the supply channel 130 and the collection channel 140. The ink in the pressure control chamber passes through the supply channel 130 and the collection channel 140 and is discharged from the discharge port 13.

That is, a portion (hole) that communicates with the supply channel 130 or the collection channel 140 may be arranged at a position where an ink easily precipitates in the pressure control chamber of a pressure control means. Consequently, the precipitated ink easily flows into the supply channel 130 or the collection channel 140 and can be sucked and discharged from the discharge port 13. In FIGS. 10A to 10E, the connection portion 250 with the supply channel 130 of the first pressure control chamber 122 and the connecting portion 270 with the collection channel 140 of the second pressure control chamber 152 are both respectively arranged vertically below the pressure control chambers (the first pressure control chamber and the second pressure control chamber).

Furthermore, the connecting portion 260 between the first pressure control chamber 122 and the bypass flow channel 160 and the connecting portion 280 between the first pressure control chamber 122 and the pump outlet channel 180 are also arranged vertically below the first pressure control chamber 122, and the connecting portion 240 between the second pressure control chamber 152 and the pump inlet channel 170 is also arranged vertically below the second pressure control chamber 152. Consequently, in the pressure control chamber in the circulation path, bag-shaped stagnation regions becoming a dead spot in the circulation flow where the ink precipitates and is difficult to circulate are eliminated.

The arrangement "vertically below a pressure control chamber" in the description above may be, in the posture of the liquid discharge head during printing, within half the length of the pressure control chamber from the downward end in the vertical direction or may be within ¼ of the length of the pressure control chamber from the downward end in the vertical direction.

Figure 22A:
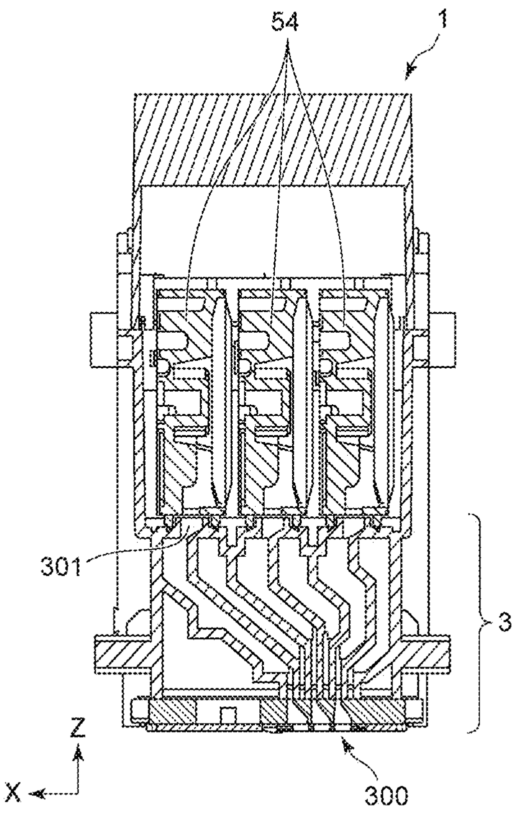
FIGS. 22A and 22B are cross-sectional views of a connecting portion of a circulation unit and a discharge unit.
Figure 22B:
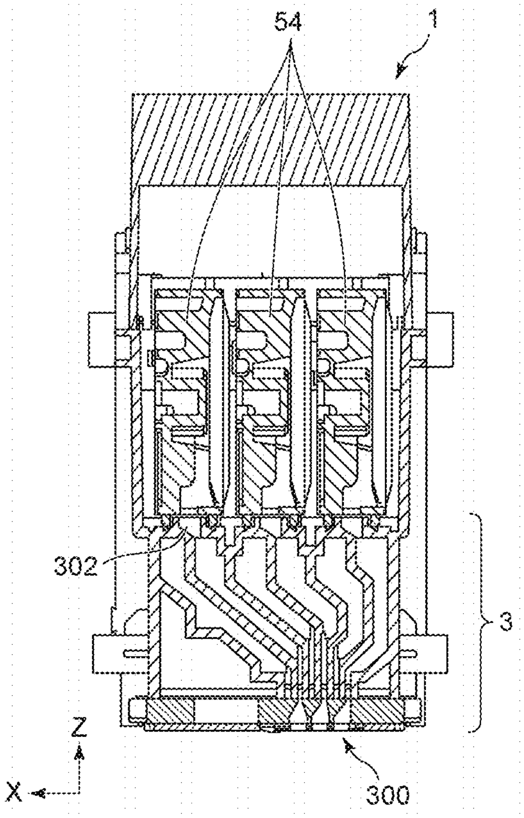

Furthermore, the flow channel in the discharge unit 3 may have a structure in which the precipitated ink in the circulation path is easily discharged to the outside from the discharge port 13 and in the connection portion between the circulation unit 54 and the discharge unit 3, the walls of the flow channels 301, 302 may be perpendicular or oblique to the vertical direction. That is, in the portion where the discharge unit 3 and the circulation unit 54 are in fluid contact, the wall of the flow channel fluid-connected to the circulation unit 54 in the discharge unit 3 may be perpendicular or oblique to the vertical direction. Consequently, it is obtained an effect of drawing the ink component precipitated in the circulation unit 54 into the supply channel 130 or the collection channel 140 and easily discharging the ink from the discharge port 13 in the connecting portion between the supply port 88 and the support member supply port 211 and the connecting portion between the collection port 89 and the support member collection port 212. FIGS. 22A and 22B are cross-sectional views of another example of the liquid discharge head 1. FIG. 22A is a cross-sectional view illustrating the connecting portion between the circulation unit 54 and the discharge unit 3 on the liquid supply side, and FIG. 22B is a cross-sectional view illustrating the connecting portion between the circulation unit 54 and the discharge unit 3 on the liquid collection side.

FIGS. 22A and 22B show a configuration in which the walls of the flow channels 301, 302 are perpendicular or oblique to the vertical direction in the connecting portion between the circulation unit 54 and the discharge unit 3.

As described above, the present embodiment uses an example in which the communication port 191B in the second pressure regulation device 150 becomes the open state when the circulation pump 500 is driven to circulate an ink and becomes the closed state when the circulation of the ink stops, but is not limited thereto. The control pressure may be set such that the communication port 191B in the second pressure regulation device 150 is in the closed state even when the circulation pump 500 is driven to circulate an ink. Hereinafter, the bypass flow channel 160 will be specifically described together with its function.

The bypass flow channel 160 connecting between the first pressure regulation device 120 and the second pressure regulation device 150 is provided, for example, for preventing the discharge module 300 from being influenced by a negative pressure generated in the circulation path that is stronger than a predetermined value. The bypass flow channel 160 may be provided also for supplying an ink to the pressure chamber 12 from both sides of the supply channel 130 and the collection channel 140.

An example in which a bypass flow channel 160 is provided for preventing the discharge module 300 from being influenced by a negative pressure stronger than a predetermined value will now be described. For example, the characteristics (e.g., viscosity) of an ink may vary in response to a change in the environmental temperature. If the viscosity of an ink changes, the pressure loss in the circulation path also changes. For example, if the viscosity of an ink decreases, the pressure loss amount in the circulation path also decreases. As a result, the flow rate of the circulation pump 500 that is driven at a certain driving amount is increased to increase the flow rate flowing in the discharge module 300. At the same time, since the discharge module 300 is maintained at a constant temperature by a temperature adjustment mechanism (not shown), the viscosity of the ink in the discharge module 300 remains constant even if the environmental temperature changes. The flow rate of the ink flowing in the discharge module 300 increases while the viscosity of the ink in the discharge module 300 does not change. Consequently, the negative pressure in the discharge module 300 is strengthened by the flow resistance. The negative pressure in the discharge module 300 thus gets stronger than a predetermined value to break the meniscus of the discharge port 13, and the outside air is drawn into the circulation path, resulting in a risk that normal discharge cannot be performed. Even if the meniscus is not broken, the negative pressure of the pressure chamber 12 becomes stronger than a predetermined value, which may affect the discharge.

Accordingly, in the present embodiment, the bypass flow channel 160 is formed in the circulation path. When the negative pressure becomes stronger than a predetermined value by providing the bypass flow channel 160, since the ink also flows in the bypass flow channel 160, the pressure in the discharge module 300 can be maintained constant. Accordingly, for example, a control pressure may be set such that the communication port 191B in the second pressure regulation device 150 maintains the closed state even during the driving of the circulation pump 500, and a control pressure in the second pressure regulation device may be set such that when the negative pressure is stronger than a predetermined value, the communication port 191 of the second pressure regulation device 150 becomes the open state. That is, if the meniscus does not collapse even when the pump flow rate changes due to a change in the viscosity caused by environmental changes, or a predetermined negative pressure is maintained, the communication port 191B may be the closed state during the circulation pump 500 is being driven.

An example in which the bypass flow channel 160 is provided for supplying an ink to the pressure chamber 12 from both sides of the supply channel 130 and the collection channel 140 will now be described. The pressure variation in the circulation path can occur also by the discharge operation by the discharge element 15. This is because the discharge operation generates a force that draws an ink into the pressure chamber.

The point that the ink to be supplied to the pressure chamber 12 is supplied from both sides, the supply channel 130 side and the collection channel 140 side, when continuing high duty printing will now be described. Although the definition of the duty may vary due to various conditions, here, the state in which one ink droplet of 4 pL is printed on a 1200 dpi grid is treated as 100%. High duty printing is, for example, printing at 100% duty.

When high duty printing is continued, the amount of the ink flowing into the second pressure control chamber 152 from the pressure chamber 12 through the collection channel 140 is decreased. On the other hand, since the circulation pump 500 sends out a certain amount of the ink, the balance between inflow and outflow in the second pressure control chamber 152 is disrupted, the ink in the second pressure control chamber 152 is decreased, the negative pressure in the second pressure control chamber 152 becomes stronger, and the second pressure control chamber 152 is contracted. The amount of the ink flowing into the second pressure control chamber 152 through the bypass flow channel 160 is increased by that the negative pressure in the second pressure control chamber 152 becomes stronger, and the second pressure control chamber 152 is stabilized in a state in which the outflow and inflow are balanced. Thus, as a result, the negative pressure in the second pressure control chamber 152 becomes stronger depending on the duty. As described above, in the configuration in which the communication port 191B is the closed state during the operation of the circulation pump 500, the communication port 191B becomes the open state depending on the duty, and the ink flows into the second pressure control chamber 152 from the bypass flow channel 160.

When continuing further high duty printing, the amount flowing into the second pressure control chamber 152 from the pressure chamber 12 through the collection channel 140 decreases, instead, the amount passing through the bypass flow channel 160 and flowing into the second pressure control chamber 152 from the communication port 191B increases. When this state further progresses, the amount of the ink flowing into the second pressure control chamber 152 from the pressure chamber 12 through the collection channel 140 becomes zero, all the ink that flows out to the circulation pump 500 is the ink flows in through the communication port 191B. When this state further progresses, this time, the ink flows back into the pressure chamber 12 from the second pressure control chamber 152 through the collection channel 140. In this state, the ink flowing out from the second pressure control chamber 152 to the circulation pump 500 and the ink flowing out to the pressure chamber 12 pass through the bypass flow channel 160 and flow into the second pressure control chamber 152 from the communication port 191B through the bypass flow channel 160. In this case, the pressure chamber 12 is filled with the ink in the supply channel 130 and the ink in the collection channel 140, and discharge is performed.

This backflow occurring when the printing duty is high is a phenomenon caused by providing the bypass flow channel 160. In the above, although an example in which the communication port 191B in the second pressure regulation device becomes the open state in response to the backflow of an ink has been described, backflow of an ink may occur when the communication port 191B in the second pressure regulation device is the open state.

Also in a configuration not providing the second pressure regulation device, the backflow of the ink can occur by providing the bypass flow channel 160.

Configuration of Discharge Unit

Figure 11A:
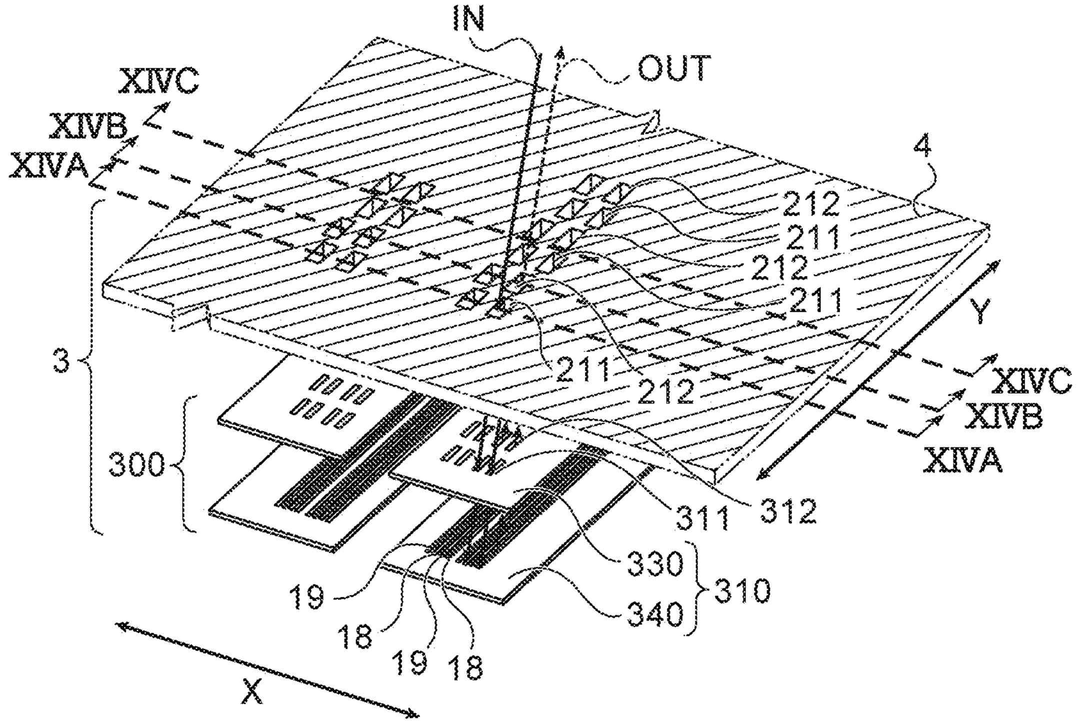
FIGS. 11A and 11B are schematic views illustrating a circulation path in a discharge unit.
Figure 11B:
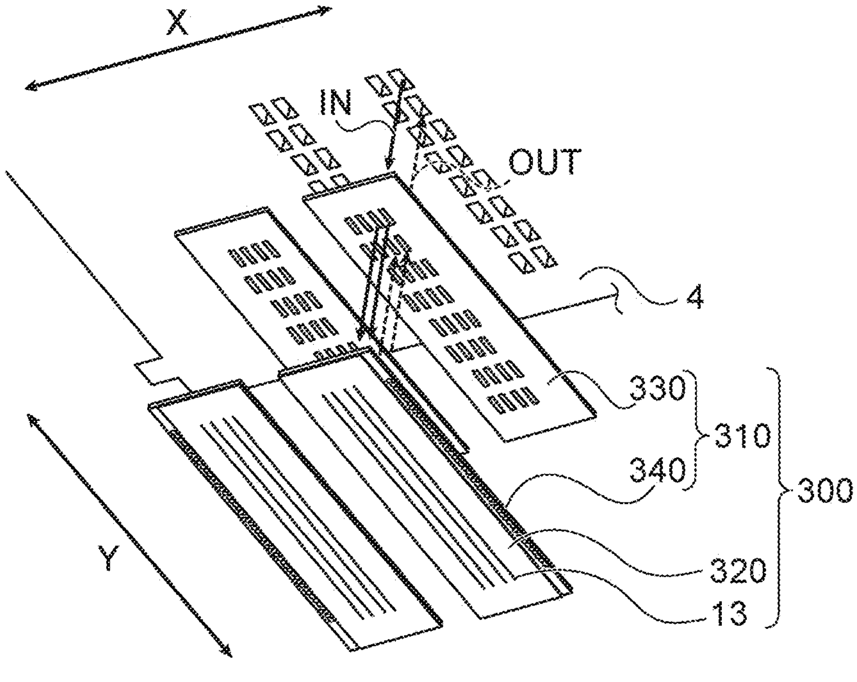
Figure 12:
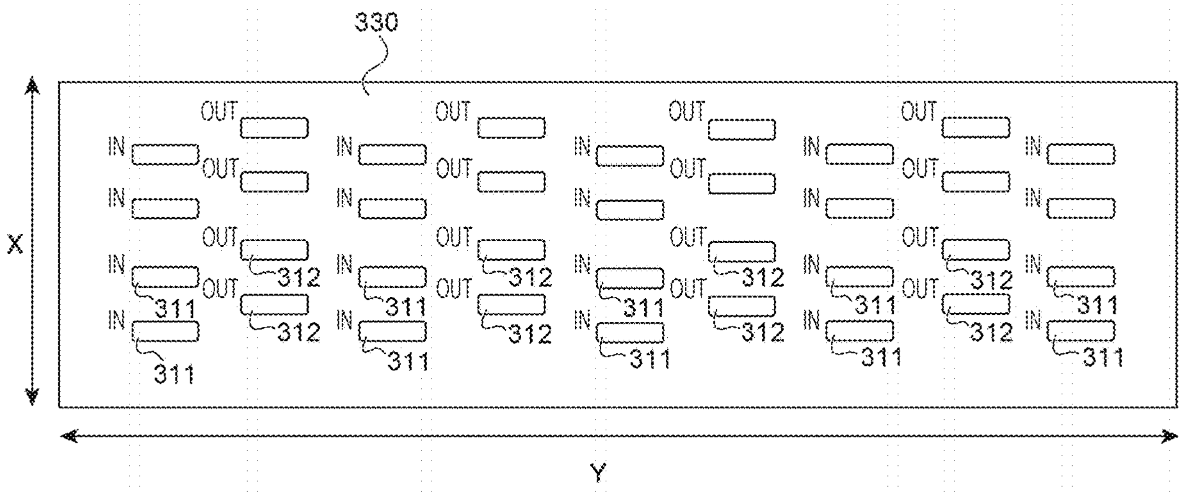
FIG. 12 is a diagram illustrating an opening plate 330.
Figure 13:
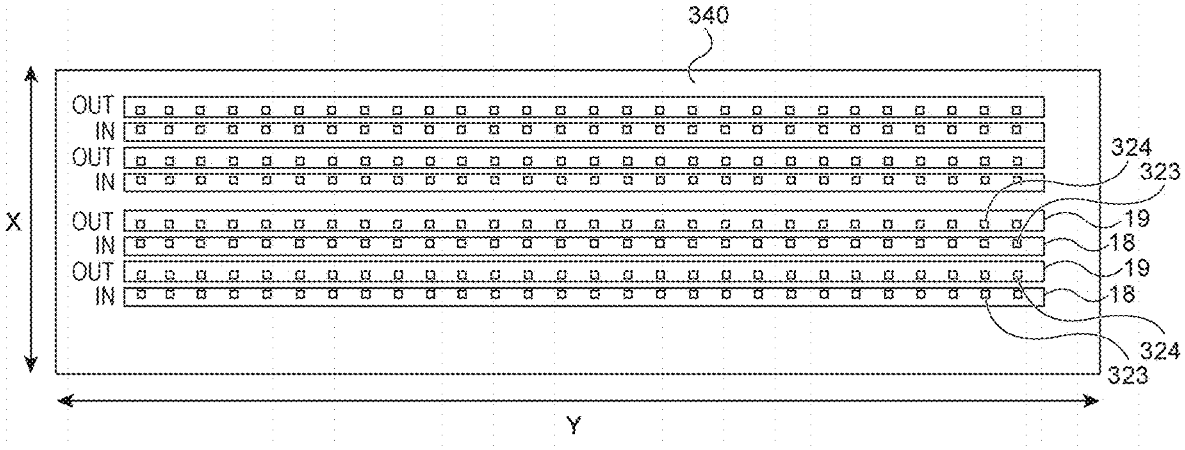
FIG. 13 is a diagram illustrating a discharge element substrate.

FIGS. 11A and 11B are schematic views illustrating a circulation path for one color ink in a discharge unit 3 of the present embodiment. FIG. 11A is an exploded perspective view taken from the first support member 4 side of the discharge unit 3, and FIG. 11B is an exploded perspective view taken from the discharge module 300 side of the discharge unit 3. The arrows of IN and OUT in the drawings indicate ink flows. The ink flow will be described for one color only, but the flows of other colors are the same. In FIGS. 11A and 11B, the second support member 7 and the electric wiring member 5 are omitted, and the description thereof is omitted also in the following description of the configuration of the discharge unit. The first support member 4 in FIG. 11A is a cross section taken along the line XIA-XIA of FIG. 3A. The discharge module 300 includes a discharge element substrate 340 and an opening plate 330. FIG. 12 is a diagram illustrating the opening plate 330, and FIG. 13 is a diagram illustrating the discharge element substrate 340.

The discharge unit 3 is supplied with an ink from the circulation unit 54 through a joint member 8 (see FIG. 3A). The path from the joint member 8 until the joint member 8, where an ink passes through and reaches, will now be described. In the following drawings, the joint member 8 is omitted.

The discharge module 300 includes a discharge element substrate 340 and an opening plate 330 composing a silicon substrate 310 and further includes a discharge port forming member 320. The discharge element substrate 340, the opening plate 330, and the discharge port forming member 320 overlap with each other and are bonded such that the flow channels of each ink are communicated with each other to form the discharge module 300, and are supported by a first support member 4.

The discharge module 300 is supported by the first support member 4 to form the discharge unit 3. The discharge element substrate 340 includes a discharge port forming member 320, and the discharge port forming member 320 includes a plurality of discharge port arrays of lines each consisting of a plurality of discharge ports 13 and discharges part of the ink, supplied through an ink flow channel in the discharge module 300, from the discharge port 13. The ink not discharged is collected from the ink flow channel in the discharge module 300.

As shown in FIGS. 11A, 11B, and 12, the opening plate 330 includes a plurality of arranged ink supply ports 311 and a plurality of arranged ink collection ports 312. As shown in FIGS. 13 and 14A to 14C, the discharge element substrate 340 includes a plurality of arranged supply connection channels 323 and a plurality of arranged collection connection channels 324. The discharge element substrate 340 further includes a common supply channel 18 communicating with a plurality of the supply connection channels 323 and a common collection channel 19 communicating with a plurality of the collection connection channels 324. The ink flow channel in the discharge unit 3 is formed by communicating the ink supply channel 48 and the ink collection channel 49 (see FIG. 3A) provided in the first support member 4 and the flow channel provided in the discharge module 300. The support member supply port 211 is a cross-sectional opening forming the ink supply channel 48, and the support member collection port 212 is a cross-sectional opening forming the ink collection channel 49.

The ink to be supplied to the discharge unit 3 is supplied to the ink supply channel 48 (see FIG. 3A) of the first support member 4 from the circulation unit 54 (see FIG. 3A) side. The ink passing through the support member supply port 211 in the ink supply channel 48 is supplied to the common supply channel 18 of the discharge element substrate 340 through the ink supply channel 48 (see FIG. 3A) and the ink supply port 311 of the opening plate 330, and enters the supply connection channel 323. The channel up to this point is the supply side flow channel. Subsequently, the ink passes through the pressure chamber 12 (see FIG. 3B) of the discharge port forming member 320 and flows to the collection connection channel 324 of the collection side flow channel. The detail of the ink flow in the pressure chamber 12 will be described later.

In the collection side flow channel, the ink entered into the collection connection channel 324 flows into the common collection channel 19. Subsequently, the ink flows into the ink collection channel 49 of the first support member 4 from the common collection channel 19 through the ink collection port 312 of the opening plate 330, passes through the support member collection port 212, and is collected in the circulation unit 54.

The region in the opening plate 330 where there is no ink supply port 311 and ink collection port 312 corresponds to the region for separating the support member supply port 211 and the support member collection port 212 from each other on the first support member 4. The region does not include the first support member 4 and openings. Such a region is used as an adhesion region when the discharge module 300 and the first support member 4 are bonded to each other.

In FIG. 12, the opening plate 330 is provided with a plurality of rows each consisting of a plurality of openings arranged in the X direction and being arranged in the Y direction, wherein the openings are arranged such that supply (IN) openings and collection (OUT) openings are alternately arranged in the Y direction so as to be shifted by a half pitch in the X direction. In FIG. 13, in the discharge element substrate 340, common supply channels 18 communicating with a plurality of supply connection channels 323 arranged in the Y direction and common collection channels 19 communicating with a plurality of collection connection channels 324 arranged in the Y direction are alternately arranged in the X direction. The common supply channels 18 and the common collection channels 19 are separated by the type of the ink, and the numbers of the common supply channel 18 and the common collection channel 19 to be arranged are determined depending on the number of the discharge port arrays of each color. The supply connection channels 323 and the collection connection channels 324 are also arranged in a number corresponding to the number of the discharge ports 13. It is not necessary to be a one-to-one correspondence, and one supply connection channel 323 and one collection connection channel 324 may correspond to a plurality of discharge ports 13.

The above-described opening plate 330 and the discharge element substrate 340 overlap with each other and are bonded such that the flow channels of each ink are communicated with each other to form the discharge module 300 and are supported by a first support member 4 to form an ink flow channel including the above-described supply channel and collection channel.

Figure 14A:
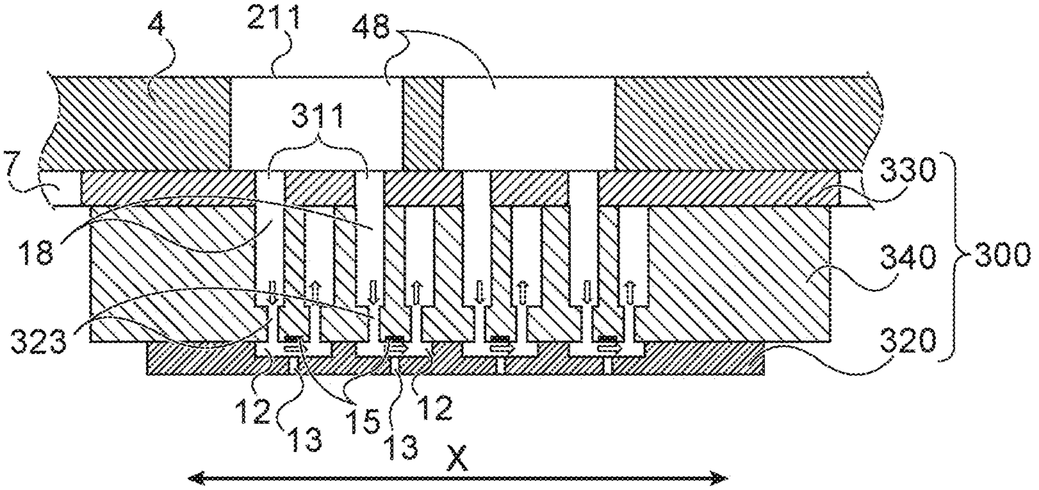
FIGS. 14A to 14C are cross-sectional views illustrating an ink flow in a discharge unit.
Figure 14B:
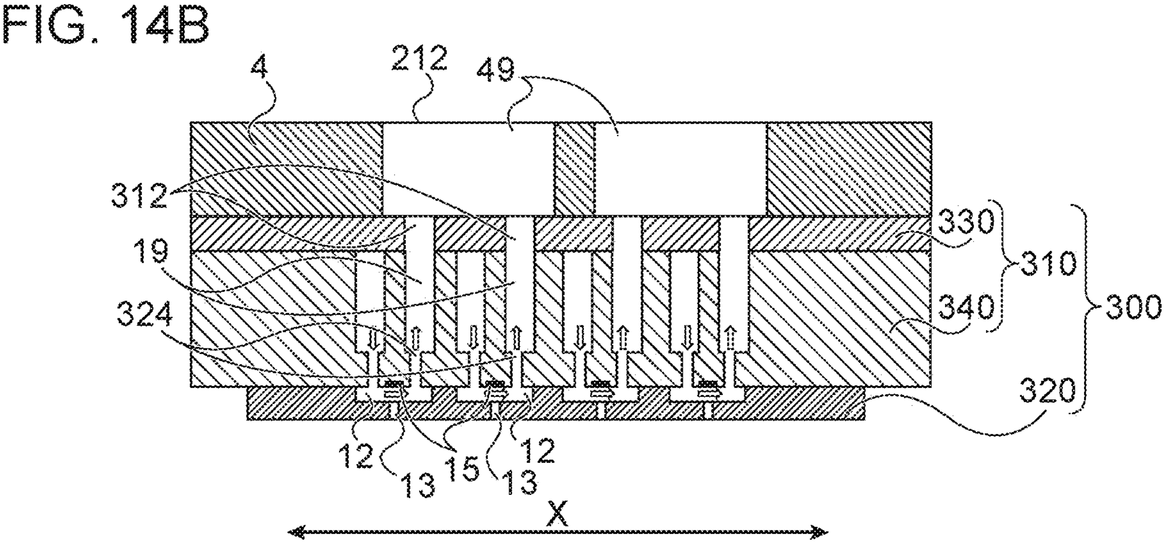
Figure 14C:
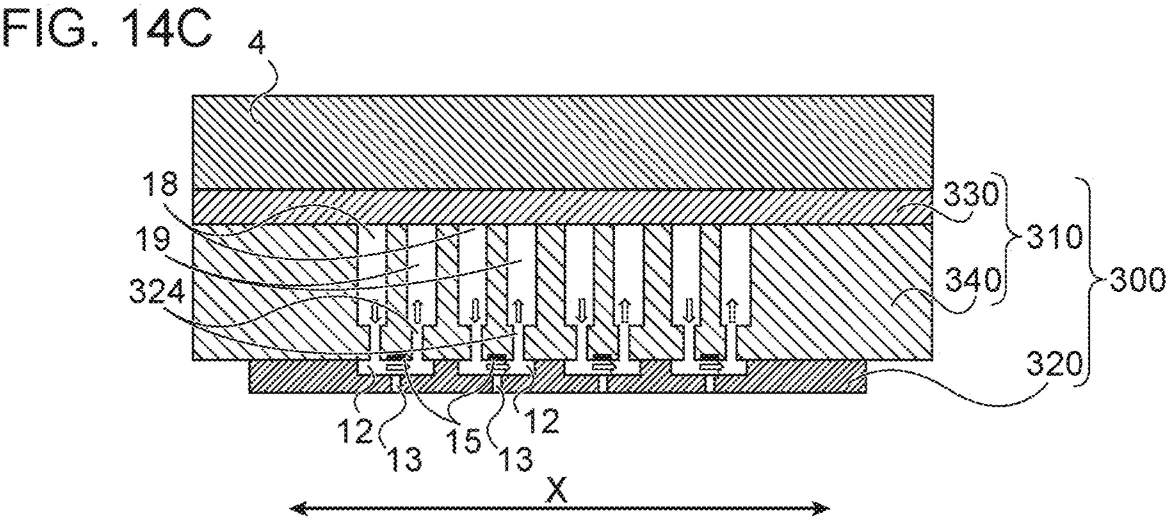

FIGS. 14A to 14C are cross-sectional views illustrating ink flow in a discharge unit at three different portions of the discharge unit 3. FIG. 14A is a cross section taken along the line XIVA-XIVA of FIG. 11A and shows a cross section of a portion where the ink supply channel 48 and the ink supply port 311 are communicated with each other in the discharge unit 3. FIG. 14B is a cross section taken along the line XIVB-XIVB of FIG. 11A and shows a cross section of a portion where the ink collection channel 49 and the ink collection port 312 are communicated with each other in the discharge unit 3. FIG. 14C is a cross section taken along the line XIVC-XIVC of FIG. 11A and shows a cross section of a portion where the ink supply port 311 and the ink collection port 312 are not communicated with the flow channel of the first support member 4.

In the supply channel for supplying an ink, as shown in FIG. 14A, the ink is supplied from a portion where the ink supply channel 48 of the first support member 4 and the ink supply port 311 of the opening plate 330 overlap and communicate with each other. In the collection channel for collecting an ink, as shown in FIG. 14B, the ink is collected from a portion where the ink collection channel 49 of the first support member 4 and the ink collection port 312 of the opening plate 330 overlap and communicate with each other. As shown in FIG. 14C, in part of the discharge unit 3, the opening plate 330 also includes a region not provided with an opening. In such a region, no ink is supplied and collected between the discharge element substrate 340 and the first support member 4. As shown in FIG. 14A, an ink is supplied in the region provided with the ink supply port 311, and as shown in FIG. 14B, an ink is collected in the region provided with the ink collection port 312. In the present embodiment, although an example of a configuration using the opening plate 330 has been described, the configuration may be that not using the opening plate 330. In an example of the configuration, flow channels corresponding to the ink supply channel 48 and the ink collection channel 49 may be formed in the first support member 4, and the discharge element substrate 340 may be bonded to the first support member 4.

Figure 15A:
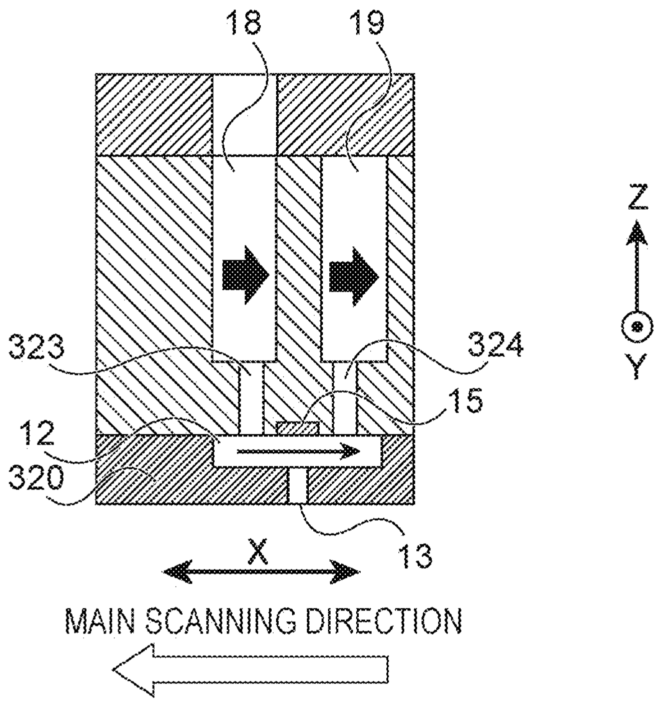
FIGS. 15A and 15B are cross-sectional views illustrating the vicinity of a discharge port.
Figure 15B:
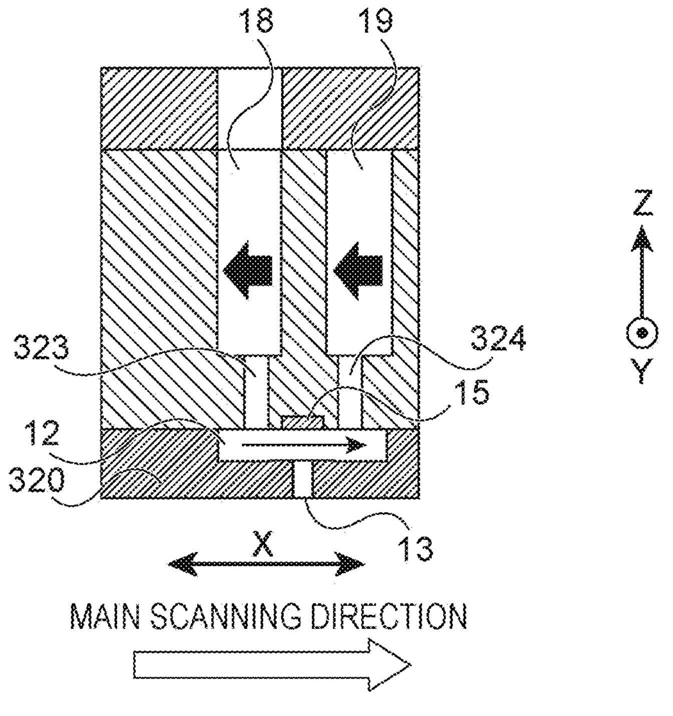
Figure 16A:
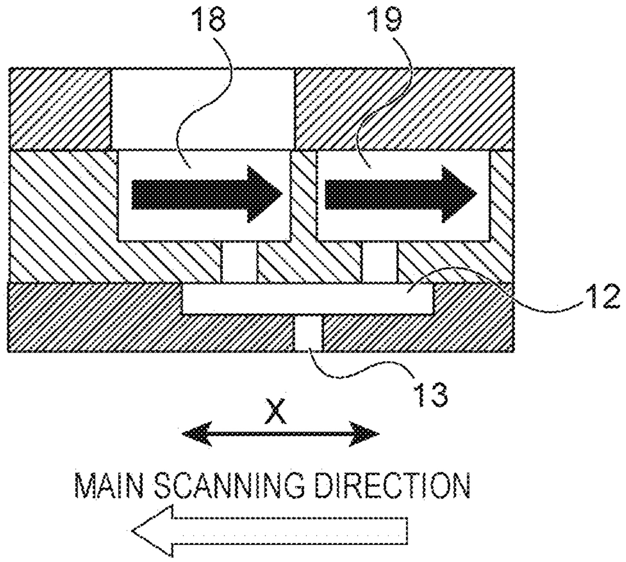
FIGS. 16A and 16B are cross-sectional views illustrating a comparative example of the vicinity of a discharge port.
Figure 16B:
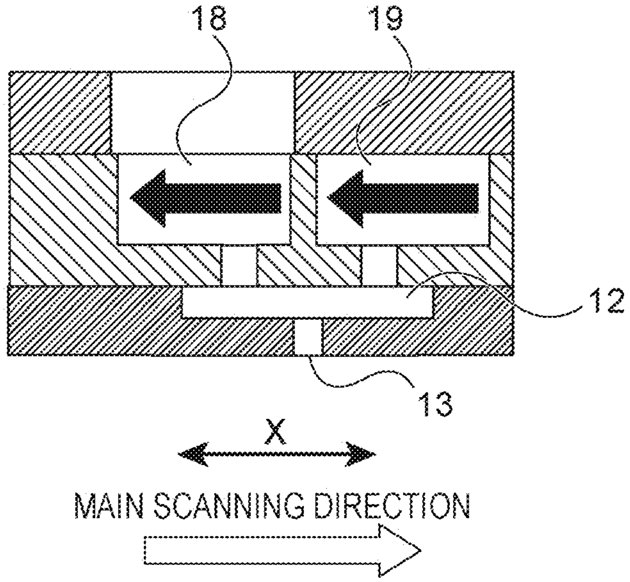

FIGS. 15A and 15B are cross-sectional views illustrating the vicinity of the discharge port 13 in the discharge module 300, and FIGS. 16A and 16B are cross-sectional views illustrating a discharge module having a configuration in which the common supply channel 18 and the common collection channel 19 are widened in the X direction as a comparative example. The thick arrows shown in the common supply channel 18 and the common collection channel 19 of FIGS. 15A, 15B, 16A, and 16B indicate fluctuations of an ink in a configuration using a serial-type liquid discharge apparatus 50. The ink passed through the common supply channel 18 and the supply connection channel 323 and supplied to the pressure chamber 12 is discharged from the discharge port 13 by driving the discharge element 15. When the discharge element 15 is not driven, the ink is collected from the pressure chamber 12 to the common collection channel 19 through the collection connection channel 324 as a collection channel.

In a configuration using a serial-type liquid discharge apparatus 50, when the thus-circulating ink is discharged, the discharge of the ink is not a little influenced by the fluctuations of the ink in the ink flow channel by the main scanning of the liquid discharge head 1. Specifically, the influence by the fluctuations of the ink in the ink flow channel may appear as a difference in the discharge amount of the ink and a deviation in the discharge direction. As shown in FIGS. 16A and 16B, when the common supply channel 18 and the common collection channel 19 have cross-sectional shapes wide in the X direction which is the main scanning direction, the ink in the common supply channel 18 and the common collection channel 19 tends to receive inertial force in the main scanning direction, and large fluctuations occur in the ink. As a result, the fluctuations of the ink may affect the discharge of the ink from the discharge port 13. If the common supply channel 18 and the common collection channel 19 are widened in the X direction, the distance between colors is widened, which may reduce the printing efficiency.

Accordingly, the common supply channel 18 and the common collection channel 19 of the present embodiment are configured so as to extend in the Y direction in the cross sections shown in FIGS. 15A and 15B and also extend in the Z direction that is perpendicular to the X direction which is the main scanning direction. In such a configuration, the flow channel width of each of the common supply channel 18 and the common collection channel 19 in the main scanning direction can be decreased. The fluctuations of the ink due to inertial force (thick black arrows in the drawings) acting on the ink in the common supply channel 18 and the common collection channel 19 during scanning to the opposite side of the main scanning direction can be reduced by decreasing each flow channel width of each of the common supply channel 18 and the common collection channel 19 in the main scanning direction. Consequently, influence by the fluctuations of the ink on discharge can be suppressed. In addition, the cross-sectional area is increased by extending the common supply channel 18 and the common collection channel 19 in the Z direction, and flow channel pressure loss is thereby reduced.

As described above, it is configured such that the fluctuations of the ink in the common supply channel 18 and the common collection channel 19 during main scanning are decreased by decreasing the flow channel width of each of the common supply channel 18 and the common collection channel 19 in the main scanning direction, but this does not mean that the fluctuations will disappear. Accordingly, in order to suppress the occurrence of a difference in discharge for each type of the ink, which may still occur due to reduced fluctuations, in the present invention, it is configured such that the common supply channel 18 and the common collection channel 19 are arranged so as to overlap in the X direction.

As described above, in the present embodiment, the supply connection channel 323 and the collection connection channel 324 are provided corresponding to the discharge port 13, and the supply connection channel 323 and the collection connection channel 324 are arranged with the discharge port 13 therebetween in the X direction into a correspondence relation. Consequently, the common supply channel 18 and the common collection channel 19 have a portion not overlapping in the X direction, and if the correspondence relation between the supply connection channel 323 and the collection connection channel 324 in the X direction is broken, the flow and discharge of the ink in the X direction in the pressure chamber 12 are influenced. When the influence of fluctuations of the ink is added thereto, the discharge of the ink from each discharge port may be influenced.

Accordingly, the ink fluctuations in the common supply channel 18 and the common collection channel 19 during main scanning are approximately the same at any position where the discharge ports 13 are arranged in the Y direction by arranging the common supply channel 18 and the common collection channel 19 so as to overlap in the X direction. As a result, the pressure difference between the common supply channel 18 side and the common collection channel 19 side occurring in the pressure chamber 12 does not significantly vary, and stable discharge can be performed.

In the configuration of some liquid discharge heads for circulating inks, the flow channel for supplying an ink to the liquid discharge head and the flow channel for collecting the ink are the same. However, in the present embodiment, the common supply channel 18 and the common collection channel 19 are different flow channels. The supply connection channel 323 and the pressure chamber 12 communicate with each other, the pressure chamber 12 and the collection connection channel 324 communicate with each other, and the ink is discharged from the discharge port 13 of the pressure chamber 12. That is, it is configured that the pressure chamber 12 that is a path for connecting between the supply connection channel 323 and the collection connection channel 324 includes the discharge port 13. Accordingly, in the pressure chamber 12, flow of the ink flowing from the supply connection channel 323 side to the collection connection channel 324 side is generated, and the ink in the pressure chamber 12 is efficiently circulated. It is possible to keep the ink in the pressure chamber 12, which tends to be influenced by evaporation of the ink through the discharge port 13, in a fresh state by efficiently circulating the ink in the pressure chamber 12.

If discharge at a high flow rate is necessary by communicating two flow channels, the common supply channel 18 and the common collection channel 19, with the pressure chamber 12, it is also possible to supply the ink from both flow channels. That is, the configuration in the present embodiment has a merit of being able to efficiently circulate an ink and also to correspond to discharge at a high flow rate compared to a configuration in which the supply and collection of an ink is performed with one flow channel only.

In addition, the influence by fluctuations of the ink is less likely to occur when the common supply channel 18 and the common collection channel 19 are arranged closer to each other in the X direction. Desirably, the distance between the flow channels is 75 to 100 μm.

Figure 17:
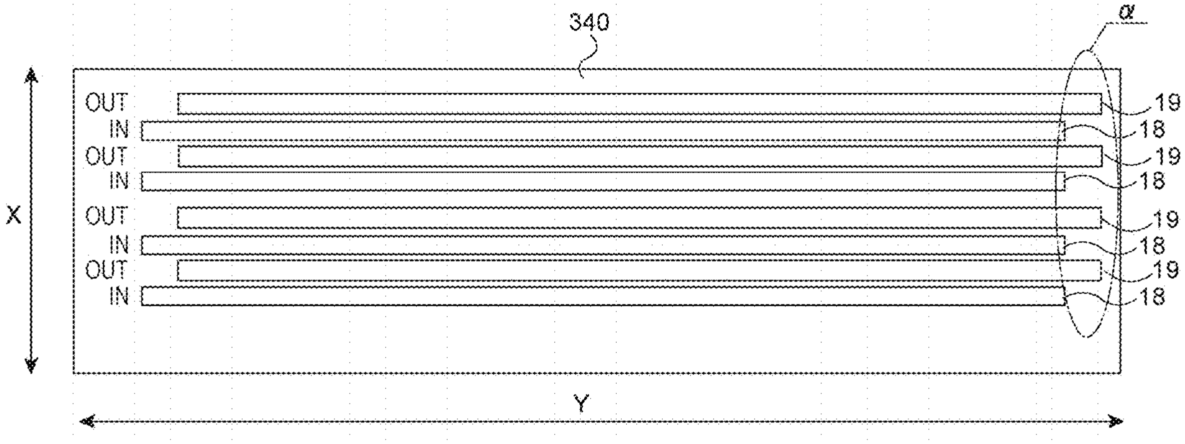
FIG. 17 is a diagram illustrating a comparative example of a discharge element substrate.

FIG. 17 is a diagram illustrating a discharge element substrate 340 as a comparative example. In FIG. 17, the illustration of the supply connection channel 323 and the collection connection channel 324 is omitted. Since the ink received thermal energy by the discharge element 15 in the pressure chamber 12 flows into the common collection channel 19, the ink with a temperature relatively high with respect to the temperature of the ink in the common supply channel 18 flows. On this occasion, in the comparative example, as the a portion surrounded by the dashed line in FIG. 17, in a portion of the discharge element substrate 340 in the X direction, there is a portion where only the common collection channel 19 exists. In this case, the temperature is locally increased at the portion to cause temperature unevenness in the discharge module 300, which may affect the discharge.

In the common supply channel 18, an ink with a temperature relatively low with respect to that in the common collection channel 19 flows. Accordingly, when the common supply channel 18 and the common collection channel 19 are adjacent to each other, in the vicinity thereof, the temperatures in the common supply channel 18 and the common collection channel 19 set-off with each other to suppress an increase in the temperature. Accordingly, the common supply channel 18 and the common collection channel 19 may have approximately the same length, be present at positions overlapping in the X direction, and be adjacent to each other.

Figure 18A:
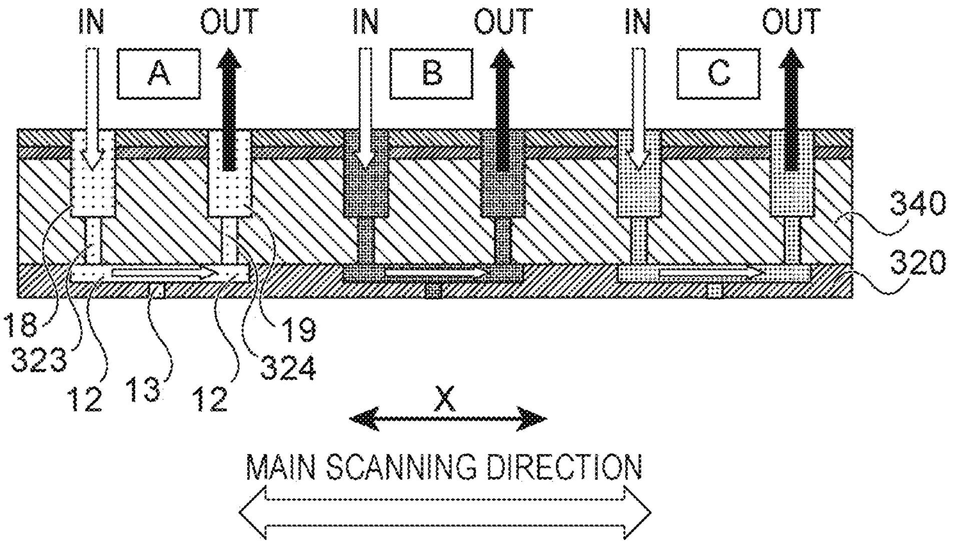
FIGS. 18A and 18B are diagrams illustrating a flow channel configuration of a liquid discharge head.
Figure 18B:
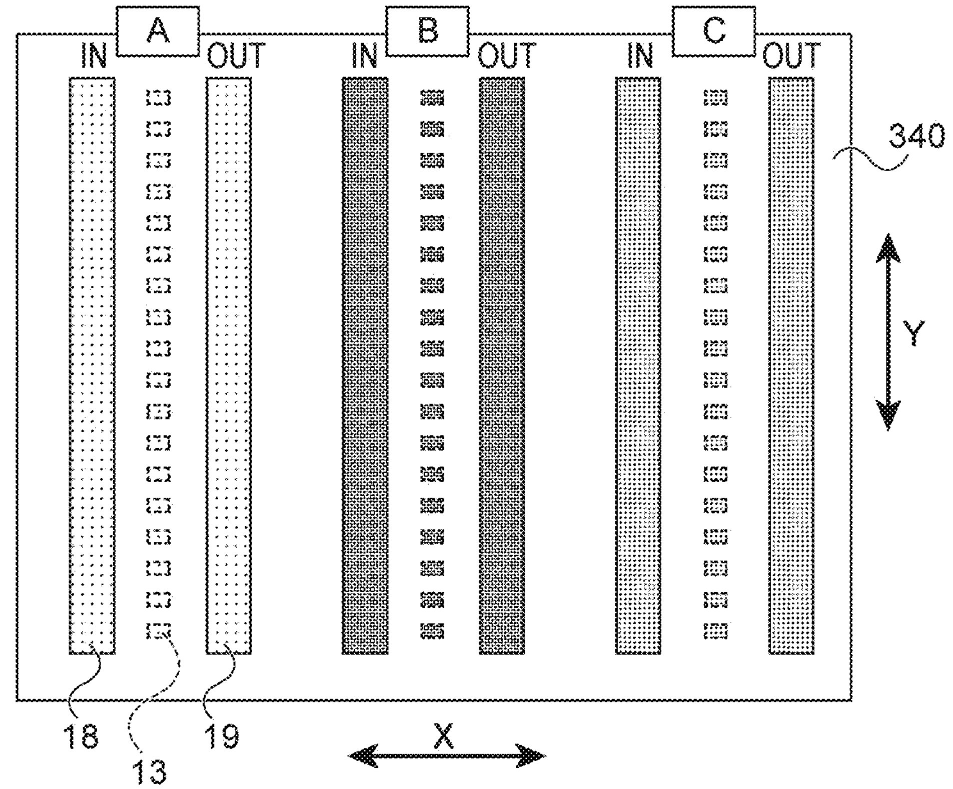

FIGS. 18A and 18B are diagrams illustrating a flow channel configuration of a liquid discharge head 1 corresponding to 3 types of inks. As shown in FIG. 18A, the liquid discharge head 1 has circulation flow channels for the respective types of the inks. The pressure chamber 12 is provided along the X direction which is the main scanning direction of the liquid discharge head 1. As shown in FIG. 18B, the common supply channel 18 and the common collection channel 19 are provided along the discharge port array of arranged discharge ports 13 so as to extend in the Y direction and sandwich the discharge port array therebetween.

Connection of Main Body Portion and Liquid Discharge Head

Figure 19:
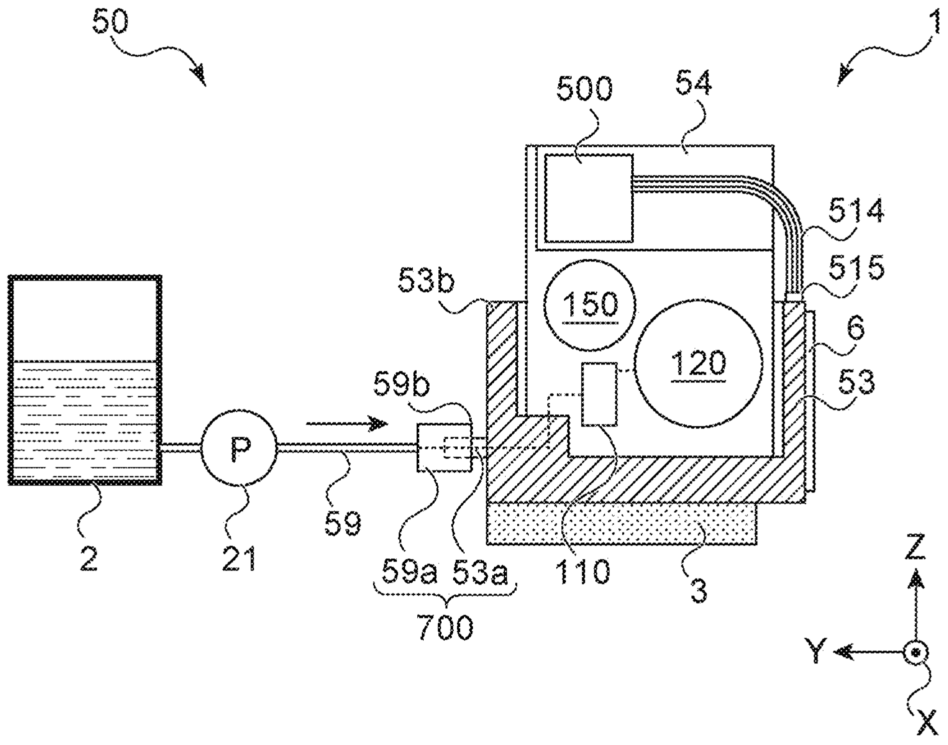
FIG. 19 is a diagram illustrating a connection status of a main body portion and a liquid discharge head of a liquid discharge apparatus.

FIG. 19 is a schematic configuration diagram illustrating in more detail the connection status of the ink tank 2 and external pump 21 with the liquid discharge head 1 provided in the main body portion of the liquid discharge apparatus 50 of the present embodiment, and the arrangement of the circulation pump and so on. The liquid discharge apparatus 50 in the present embodiment has a configuration in which only the liquid discharge head 1 can be easily replaced when malfunction occurs in the liquid discharge head 1. Specifically, the liquid discharge apparatus 50 includes a liquid connection part 700 that can easily perform connection and disconnection between the ink supply tube 59 and liquid discharge head 1 connected to the external pump 21. Consequently, only the liquid discharge head 1 can be easily attached and detached from the liquid discharge apparatus 50.

As shown in FIG. 19, the liquid connection part 700 includes a liquid connector insertion port 53*a* provided to the head housing 53 of the liquid discharge head 1 in a protruding state and a cylindrical liquid connector 59*a* that can be inserted into the liquid connector insertion port 53*a*. The liquid connector insertion port 53*a* is fluidically connected to the ink supply channel (inlet flow channel) formed in the liquid discharge head 1 and is connected to the first pressure regulation device 120 through the above-described filter 110. The liquid connector 59*a* is provided to the tip of the ink supply tube 59 connected to the external pump 21 that pressurization-supplies the ink in the ink tank 2 to the liquid discharge head 1.

The above-described liquid discharge head 1 shown in FIG. 19 can be easily attached, detached, and replaced by the liquid connection part 700. However, when the sealing property between the liquid connector insertion port 53*a* and the liquid connector 59*a* is reduced, the ink pressurization-supplied by the external pump 21 may leak from the liquid connection part 700. If the liquid-leaked ink adheres to the circulation pump 500 or the like, there is a risk of causing malfunction in the electric system. Accordingly, in the present embodiment, the circulation pump and so on are arranged as follows.

Arrangement of Circulation Pump and so on

As shown in FIG. 19, in the present embodiment, in order to avoid the ink leaked from the liquid connection part 700 from adhering to the circulation pump 500, the circulation pump 500 is arranged above the liquid connection part 700 in gravity direction. That is, the circulation pump 500 is arranged above the liquid connector insertion port 53*a*, which is an inlet port for a liquid in the liquid discharge head 1, in the gravity direction. Furthermore, the circulation pump 500 is arranged at a position where it is in non-contact with members constituting the liquid connection part 700. Consequently, even if an ink leaks from the liquid connection part 700, since the ink flows in the horizontal direction, which is the opening direction of the liquid connector 59*a*, or downward in the gravity direction, it is possible to prevent the ink from reaching the circulation pump 500 located upward in the gravity direction. In addition, since the circulation pump 500 is located at a position away from the liquid connection part 700, a risk that an ink travels through the members and reaches the circulation pump 500 is also reduced.

The electrical connection portion 515 for electrically connecting between the circulation pump 500 and the electric contact substrate 6 via a flexible wiring member 514 is provided above the liquid connection part 700 in the gravity direction. Consequently, a risk of causing an electrical trouble by an ink from the liquid connection part 700 can be reduced.

In the present embodiment, since the wall 52*b* of the head housing 53 is provided, even if an ink spouts from the opening 59*b* of the liquid connection part 700, it is possible to block the ink and reduce a risk that the ink reaches the circulation pump 500 or the electrical connection portion 515.

Figure 20:
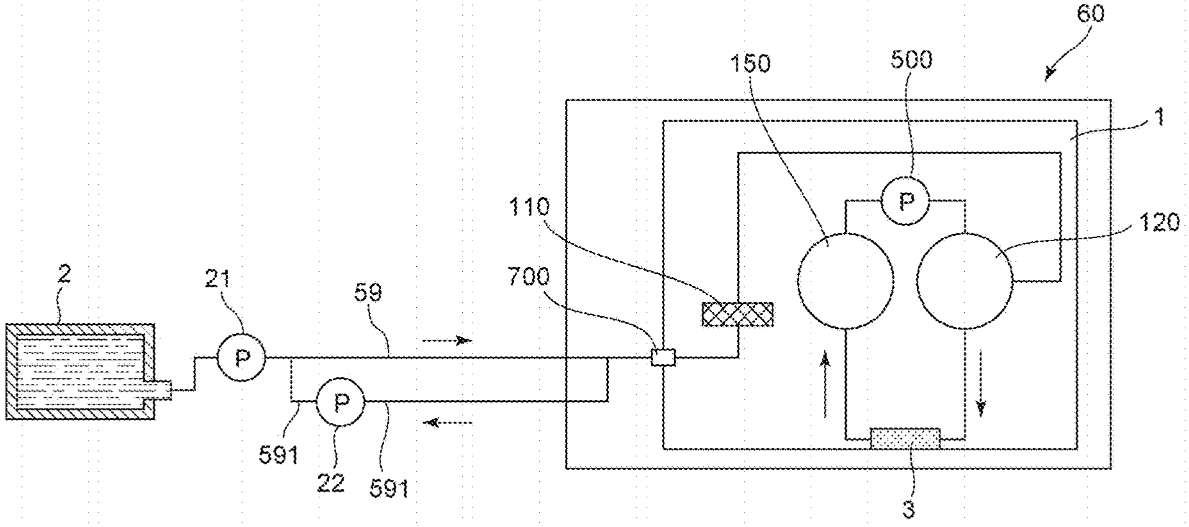
FIG. 20 is a diagram illustrating an ink circulation system.

FIG. 20 shows an ink circulation system in the present embodiment. In the present embodiment, an ink is pressurization-supplied to the liquid discharge head 1 using the external pump 21 from the ink tank 2 through the liquid connection part 700. The external pump 21 has a role of drawing an ink from the ink tank 2 and pressurization-supplying the ink to the liquid discharge head 1.

A flow channel 591 is provided between the external pump 21 and the liquid connection part 700 so as to be parallel to the ink supply tube 59. A secondary external pump 22 is provided to the flow channel 591 and is configured such that an ink circulates in a range from downstream of the external pump (first external pump) 21 to the carriage 60. Consequently, it is possible to stir the ink also in the flow channel other than the liquid discharge head 1 of the liquid discharge apparatus 50.

Figure 21:
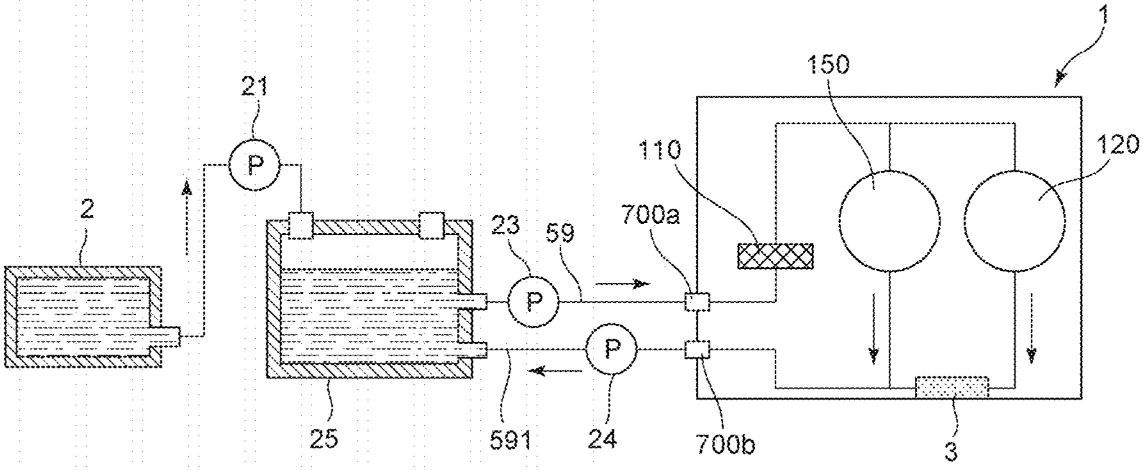
FIG. 21 is a diagram illustrating an ink circulation system.

Here, FIG. 21 shows an ink circulation system of a comparative example. An ink is sent to a sub-tank 25 from an ink tank 2 using an external pump 21. Subsequently, the ink is circulated (stirred) in the sub-tank 25 and the liquid discharge head 1 and the entire flow channel therebetween by a supply pump 23 and a collection pump 24. In this case, since it is necessary that the ink flows from the sub-tank 25 to the liquid discharge head 1 and in the entire liquid discharge apparatus 50, the supply pump 23 and the collection pump 24 are required to have relatively high ability than the pump of the present embodiment. In addition, since the liquid discharge head 1 needs connection parts of two systems, a liquid connection part 700*a* for supply and a liquid connection part 700*b* for discharge, the size of the liquid discharge head 1 tends to increase. Furthermore, since the collection pump 24 and the discharge unit 3 are directly fluid-connected, the pulsation of the collection pump 24 tends to spread to the discharge unit 3, and a reduction in the quality of printed images may be caused. In addition, in a serial-type liquid discharge head 1, since both the ink supply tube 59 and the ink collection tube 591 fluctuate by scanning, a change in the pressure by the fluctuations of the ink collection tube tends to spread to the liquid discharge unit 3, and a reduction in the quality of printed images may be caused. Even in an ink jet printing method using an ink circulation system and a liquid discharge apparatus not having the flow channel 591 and the secondary external pump 22 shown in FIG. 20, the effect of the present disclosure can be sufficiently obtained. The flow channel 591 and the secondary external pump 22 may be applied to only the ink circulation system for an ink containing titanium oxide. In such a case, it is possible to suppress an excessive increase in the manufacturing cost of the apparatus and an increase in the size of the apparatus while obtaining a greater effect of suppressing precipitation of an ink containing titanium oxide. The total volume of the ink flowing in only one circulation path including the circulation pump 500 in the liquid discharge head 1 is preferably 30 mL or less and more preferably 15 mL or less and is preferably 5 mL or more. That is, the volume of liquid flowing in the circulation path is preferably 5 mL or more and 30 mL or less and further preferably 5 mL or more and 15 mL or less.

As described above, in an ink circulation system as shown in FIG. 20, both a reduction in the size of the liquid discharge apparatus and an improvement in the quality of printed images can be achieved.

(2) Ink

The ink that can be used in the ink jet printing method of the present disclosure will now be described in detail by citing embodiments. In the present disclosure, when a compound is a salt, the salt in an ink is present as a dissociated ion, but is expressed as "containing a salt" for convenience. Titanium oxide and a titanium oxide particle may be simply referred to as "pigment". An aqueous ink for ink jet printing may be simply referred to as "ink". A physical value is a value at normal temperature (25° C.) unless otherwise noted. When an image of a white ink is printed, the white ink may be used in background color treatment for color inks. In such a case, an image may be printed by applying color inks (such as black, cyan, magenta, and yellow inks) so as to overlap with at least part of the region to which a white ink was applied. Alternatively, the ink can also be used in back printing in which a white ink is applied so as to overlap at least part of the region to which color inks were applied.

Aqueous Ink and Manufacturing Method of Aqueous Ink

The ink of the present disclosure is an ink containing titanium oxide. Since titanium oxide is the white pigment, this ink may be a white ink. However, as long as titanium oxide is contained, the present disclosure can be used for an ink other than white. The ink of the present disclosure does not need to be a so-called "curing ink". Accordingly, the ink of the present disclosure does not need to contain a compound, such as polymerizable compound, that can polymerize by application of external energy such as heat and light. The components constituting the ink of the present disclosure, the physical properties of the ink, a manufacturing method, and so on will now be described in detail.

Colorant

The ink contains titanium oxide as a colorant (pigment). Titanium oxide may be a titanium oxide particle surface-treated with a specific inorganic oxide. That is, the ink may contain a titanium oxide particle that is titanium oxide of which surface is coated with a specific inorganic oxide. The content (mass %) of the titanium oxide particle in an ink may be 0.10 mass % or more and 20.00 mass % or less based on the total mass of the ink. The content (mass %) of the titanium oxide particle in the ink may be 1.00 mass % or more and 20.00 mass % or less based on the total mass of the ink. Furthermore, in the present disclosure, since the redispersibility of an ink is improved by the configuration of a liquid discharge apparatus, the content (mass %) of the titanium oxide particle in the ink can be easily increased and may be 5.00 mass % or more and 20.00 mass % or less based on the total mass of the ink.

Titanium oxide is a white pigment and has three crystal forms: rutile, anatase, and brookite. In particular, the titanium oxide may be rutile titanium oxide. Examples of an industrial manufacturing method of titanium oxide include a sulfuric acid method and a chlorine method, and the titanium oxide used in the present disclosure may be manufactured by any manufacturing method.

The volume-based cumulative 50% particle size (hereinafter, also referred to as average particle size) of the titanium oxide particle may be 200 nm or more and 500 nm or less. In particular, the volume-based cumulative 50% particle size of the titanium oxide particle may be 200 nm or more and 400 nm or less.

The volume-based cumulative 50% particle size (D50) of a titanium oxide particle is the diameter of a particle that is 50% in a particle size cumulative curve when cumulated from the small particle size side based on the total volume of the measured particles. The D50 of a titanium oxide particle can be measured under conditions, for example, SetZero: 30 seconds, number of measurements: 3 times, measurement time: 180 seconds, shape: nonspherical, and refractive index: 2.60. As the particle size distribution measurement apparatus, a particle size analyzer using a dynamic light scattering method can be used. The measurement conditions and so on are not limited to the above.

Titanium oxide surface-treated with alumina and silica may be used. The surface treatment is expected to suppress photocatalytic activity and improve dispersibility. In the present specification, "alumina" is a generic name of oxides of aluminum such as aluminum oxide. In the present specification, "silica" is a generic name of silicon dioxide and a material constituted of silicon dioxide. Alumina and silica coating titanium oxide are mostly present in forms of silicon dioxide and aluminum oxide, respectively.

The proportion (mass %) of titanium oxide in the titanium oxide particle may be 90.00 mass % or more based on the total mass of the titanium oxide particle. The proportion (mass %) of titanium oxide in the titanium oxide particle may be 98.50 mass % or less based on the total mass of the titanium oxide particle. The mass ratio of the proportion (mass %) of alumina to the proportion (mass %) of silica in the titanium oxide particle is required to be 0.50 times or more and 1.00 times or less. When the mass ratio is less than 0.50 times or greater than 1.00 times, the ink cannot obtain discharge stability. The proportion (mass %) of silica in the titanium oxide particle may be 1.00 mass % or more and 4.00 mass % or less based on the total mass of the titanium oxide particle. When the proportion (mass %) of silica is less than 1.00 mass %, the affinity with a compound represented by formula (1) is not sufficiently obtained, and the discharge stability of the ink may become insufficient. When the proportion (mass %) of silica is greater than 4.00 mass %, even if surface treatment with alumina is performed, the amount of the compound represented by the formula (1) adsorbed to the titanium oxide particle cannot be suppressed, and the discharge stability of the ink may become insufficient. The proportion (mass %) of alumina in the titanium oxide particle may be 0.50 mass % or more and 4.00 mass % or less based on the total mass of the titanium oxide particle.

Examples of the method for measuring the proportion of alumina and silica in the titanium oxide particle, i.e., the coating amount of alumina and silica include quantitative analysis of aluminum and silicon elements by inductive coupling plasma (ICP) optical emission spectrometry. In such a case, the proportion can be calculated by assuming that all atoms coating the surface are oxides and converting the obtained amounts of aluminum and silicon into the oxides thereof, i.e., alumina and silica. The mass ratio of the proportion (mass %) of aluminum elements to the proportion (mass %) of silicon elements obtained by inductive coupling plasma optical emission spectrometry in the titanium oxide particle is 0.57 times or more and 1.13 times or less. When this value is converted into the oxides thereof, i.e., alumina and silica, the mass ratio of the proportion (mass %) of alumina to the proportion (mass %) of silica in the titanium oxide particle is 0.50 times or more and 1.00 times or less.

Examples of the method for surface treatment of titanium oxide include wet treatment and dry treatment. For example, surface treatment can be performed by dispersing titanium oxide in a liquid medium and then reacting it with a surface treating agent such as sodium aluminate and sodium silicate. Desired characteristics can also be adjusted by appropriately changing the ratio of these surface treating agents. The surface treatment can also use an inorganic oxide such as zinc oxide and zirconia or an organic material such as polyol, in addition to alumina and silica, as long as the effects of the present disclosure are not impaired.

As long as the effects of the present disclosure are not impaired, the ink may contain another pigment other than titanium oxide. In such a case, the ink may be any color ink other than a white ink. The content (mass %) of the pigment other than titanium oxide in the ink is preferably 0.10 mass % or more and 5.00 mass % or less and more preferably 0.10 mass % or more and 1.00 mass % or less based on the total mass of the ink.

Compound Represented by Formula (1)

The ink may contain a compound represented by the formula (1) below as a dispersant for dispersing the titanium oxide particle. The content (mass %) of the compound represented by the formula (1) in the ink is preferably 0.01 mass % or more and 1.00 mass % or less based on the total mass of the ink and further preferably 0.02 mass % or more and 0.50 mass % or less.

(1)

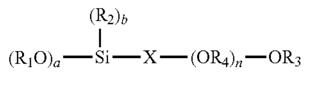

(in the formula (1), $R_1$, $R_2$, and $R_3$ are each independently a hydrogen atom or an alkyl group having 1 to 4 carbon atoms; $R_4$'s are each independently an alkylene group having 2 to 4 carbon atoms; X is a single bond or an alkylene group having 1 to 6 carbon atoms; n is from 6 to 24; and a is from 1 to 3, b is from 0 to 2, and a+b=3).

In the formula (1), $R_1$, $R_2$, and $R_3$ are each independently a hydrogen atom or an alkyl group having 1 to 4 carbon atoms. Examples of the alkyl group having 1 to 4 carbon atoms include a methyl group, an ethyl group, an n-propyl group, an i-propyl group, and an n-butyl group. In particular, from the viewpoint of ease of hydrolysis, the alkyl group may be a methyl group. When $R_1$, $R_2$, and $R_3$ are each an alkyl group having more than 4 carbon atoms, it becomes difficult to form a silanol group by hydrolysis, and affinity to the titanium oxide particle is not obtained. Accordingly, the titanium oxide particle cannot be stably dispersed, and the discharge stability of the ink is not obtained. "a" representing the number of RIO is from 1 to 3, "b" representing the number of $R_2$ is from 0 to 2, and a+b=3. In particular, "a" may represent 3 and "b" may represent 0, that is, all three substituents of the silicon atom may be RIO.

In the formula (1), $R_4$'s are each independently an alkylene group having 2 to 4 carbon atoms. Examples of the alkylene group having 2 to 4 include an ethylene group, an n-propylene group, an i-propylene group, and an n-butylene group. In particular, the alkylene group may be an ethylene group. The number of $OR_4$, that is, n representing the number (average) of alkylene oxide groups is from 6 to 24. When n is less than 6, since the length of the alkylene oxide chain is too short, the repulsive force by steric hindrance is not sufficiently obtained, and the discharge stability of the ink is not obtained. When n is greater than 24, since the length of the alkylene oxide chain is too long, the affinity is increased, which makes it easier to release into the aqueous medium. Accordingly, sufficient affinity with the surface hydroxy group of the titanium oxide particle is not obtained, and aggregation of the titanium oxide particle can be suppressed. Accordingly, the titanium oxide particle cannot be stably dispersed, and the discharge stability of the ink is not obtained.

In the formula (1), X is a single bond or an alkylene group having 1 to 6 carbon atoms. When X is a single bond, it is meant that a silicon atom and $OR_4$ are directly bonded to each other. Examples of the alkylene group having 1 to 6 carbon atoms include a methylene group, an ethylene group, an n-propylene group, an i-propylene group, an n-butylene group, an n-pentylene group, and an n-hexylene group. In particular, the alkylene group may be an n-propylene group. When the X is an alkylene group having greater than 6 carbon atoms, the hydrophobicity of the compound represented by the formula (1) becomes too high, the titanium oxide particle cannot be stably dispersed, and the discharge stability of the ink cannot be obtained.

The compound represented by the formula (1) as a dispersant for the titanium oxide particle may be a compound represented by the following formula (2). In the compound represented by the formula (2), since the number of $OR_1$ binding to a silicon atom is three, a part thereof is hydrolyzed in an aqueous medium, and three hydroxy groups binding to the silicon atom can be formed to increase a site having affinity with the titanium oxide particle. The compound represented by the following formula (2) has a repeating structure of an ethylene oxide group. Consequently, the ethylene oxide chain approximately extends in an aqueous medium, and it is possible to obtain repulsive force due to steric hindrance.

(2)

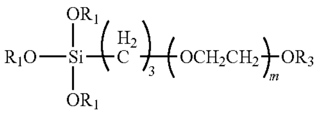

(in the formula (2), $R_1$ and $R_3$ are each independently a hydrogen atom or an alkyl group having 1 to 4 carbon atoms; and m is from 8 to 24).

The mass ratio of the compound represented by the formula (1) to the content (mass %) of the titanium oxide particle in the ink may be 0.002 times or more and 0.10 times or less. When the mass ratio is less than 0.002 times, the function of stably dispersing the titanium oxide particle is weakened, and the discharge stability of the ink may become insufficient. When the mass ratio is greater than 0.10 times, the proportion of the compound represented by the formula (1) is too high, condensation (self-condensation) between molecules of the compound represented by the formula (1) tends to occur. Consequently, the compound represented by the formula (1) is consumed without functioning as a dispersant, the function of stably dispersing the titanium oxide particle is weak, and the discharge stability of the ink may become insufficient.

The compound represented by the formula (1) forms a hydrogen bond with the surface hydroxy group of the titanium oxide particle, and it is inferred that a part thereof forms a covalent bond by dehydration reaction. However, in the present disclosure, the compound represented by the formula (1) can disperse the titanium oxide particle even if a covalent bond is not formed with the titanium oxide particle. That is, the amount of the compound represented by the formula (1) forming a covalent bond with the titanium oxide particle is very small and can be ignored. Consequently, the compound represented by the formula (1) covalent-bonded to the titanium oxide particle is not included in the content of the titanium oxide particle. As a result of study by the present inventors, it was found that if the amount of the compound represented by the formula (1) covalent-bonded to the titanium oxide particle is too large, the discharge stability of the ink decreases.

The reason of the above is inferred as follows. Since electrostatic attraction becomes less effective generally in a liquid medium with high dielectric constant such as water, the titanium oxide particle freely moves without being significantly influenced by the surrounding environment. However, if the compound represented by the formula (1) is covalent-bonded to titanium oxide particle, the portion (portion of $OR_4$) having hydrophilicity of the structure of the formula (1) forms a hydrogen bond with a water molecule. As a result, the movement of the titanium oxide particle may be influenced. Accordingly, in situations where a liquid is deformed by instantaneous pressure such as during discharging in ink jet printing, the characteristics described above appear as difference in discharge characteristics. Therefore, the amount (mass %) of the compound represented by the formula (1) covalent-bonded to the titanium oxide particle may be, as the mass ratio to the content (mass %) of the titanium oxide particle, 0.001 times or less. When the mass ratio is greater than 0.001 times, the discharge stability of the ink may become insufficient. The mass ratio may be 0.0001 times or less. The amount of the compound represented by the formula (1) covalent-bonded to the titanium oxide particle can be calculated by thermogravimetric analysis or the like.

Wax Particle

In the present disclosure, the ink may contain a wax particle. The wax may be a composition including a component other than the wax or may be the wax itself. The wax particle may be dispersed in a dispersant such as a surfactant and a resin.

The wax is an ester of a higher monovalent or divalent alcohol that is insoluble in water and fatty acid in a narrow sense, and includes animal waxes and plant waxes, but excludes oils and fats. In a broad sense, high melting point fats, mineral waxes, petroleum waxes, and blends and modified products of various waxes are included. In the printing method of the present disclosure, waxes in the broad sense can be used without any limitation. Waxes in the broad sense can be classified into natural waxes, synthetic waxes, blends thereof (compounded waxes), and modified products thereof (modified waxes).

Examples of the natural wax include animal waxes such as beeswax, spermaceti, and wool wax (lanolin); plant waxes such as vegetable wax, carnauba wax, sugarcane wax, palm wax, candelilla wax, and rice wax; mineral waxes such as montan wax; and petroleum waxes such as paraffin wax, microcrystalline wax, and petrolatum. Examples of the synthetic wax include hydrocarbon waxes such as Fischer-Tropsch wax and polyolefin wax (e.g.: polyethylene wax and polypropylene wax). The compounded waxes are mixtures of the above-mentioned various waxes. The modified waxes are obtained by subjecting the above-mentioned various waxes to modification treatment such as oxidation, hydrogenation, alcohol modification, acrylic modification, and urethane modification. The wax may be at least one selected from the group consisting of microcrystalline wax, Fischer-Tropsch wax, polyolefin wax, paraffin wax, and modified products and blends thereof. In particular, the wax may be a blend of multiple types of waxes or a blend of a petroleum wax and a synthetic wax.

The wax may be a solid at normal temperature (25° C.). The wax preferably has a melting point of 40° C. or more and 120° C. or less and further preferably 50° C. or more and 100° C. or less. The melting point of a wax can be measured in accordance with the test method described in 5.3.1 (melting point test method) of JIS K2235:1991 (petroleum wax). When the wax is microcrystalline wax, petrolatum, or a mixture of multiple types of waxes, the melting point can be measured more precisely by using the test method described in 5.3.2. The melting point of a wax is easily influenced by its characteristics such as molecular weight (higher the molecular weight, higher the melting point), molecular structure (straight chains have high melting points, but there are branches, the melting point decreases), crystallinity (higher the crystallinity, higher the melting point), and density (higher the density, higher the melting point). Accordingly, a wax can have a desired melting point by controlling these characteristics.

Resin

The ink can contain a resin. Examples of the resin include an acrylic resin, a urethane resin, and a urea resin. In particular, the resin may be an acrylic resin. The content (mass %) of the resin in the ink is preferably 1.00 mass % or more and 25.00 mass % or less based on the total mass of the ink and further preferably 3.00 mass % or more and 15.00 mass % or less and particularly preferably 5.00 mass % or more and 15.00 mass % or less.

The ink can contain a resin in application to improve various characteristics of printed images, such as abrasion resistance and concealability. Examples of the form of the resin include a block copolymer, a random copolymer, a graft copolymer, and a combination thereof. The resin may be a water-soluble resin that can be dissolved in an aqueous medium or a resin particle that is dispersed in an aqueous medium. The resin particle does not need to contain a colorant.

In the present specification, “a resin is water-soluble” means that when the resin is neutralized with an alkali in an amount equivalent to the acid value, the resin is present in an aqueous medium without forming particles having a particle size that can be measured by a dynamic light scattering method. Whether a resin is water-soluble or not can be judged by the following method. A liquid containing a resin (resin solid content: 10 mass %) neutralized with an alkali (such as sodium hydroxide and potassium hydroxide) equivalent to the acid value is prepared. Subsequently, the prepared liquid is diluted with pure water by 10 times (volume basis) to prepare a sample solution.

The particle size of the resin in a sample solution is measured by a dynamic light scattering method. When no particle having a particle size is observed, the resin can be judged to be water-soluble. The measurement conditions in this occasion can be set to, for example, SetZero: 30 seconds, number of measurements: 3 times, and measurement time: 180 seconds. As the particle size distribution measurement apparatus, a particle size analyzer (e.g., trade name: UPA-EX150, manufactured by Nikkiso Co., Ltd.) by a dynamic light scattering method can be used. The particle size distribution measurement apparatus, the measurement conditions, and so on are not limited to the above.

The acid value of the water-soluble resin is preferably 80 mg KOH/g or more and 250 mg KOH/g or less and further preferably 100 mg KOH/g or more and 200 mg KOH/g or less. When a resin particle is used, the acid value thereof may be 0 mg KOH/g or more and 50 mg KOH/g or less. The resin preferably has a weight-average molecular weight of 1,000 or more and 30,000 or less and further preferably 5,000 or more and 15,000 or less. The weight-average molecular weight of a resin is a polystyrene-equivalent value measured by gel permeation chromatography (GPC).

Aqueous Medium

The ink is an aqueous ink containing water as the aqueous medium. The ink can contain an aqueous medium that is water or a solvent mixture of water and a water-soluble organic solvent. As the water, deionized water (ion-exchanged water) may be used. The content (mass %) of water in the ink may be 50.00 mass % or more and 95.00 mass % or less based on the total mass of the ink.

The water-soluble organic solvent is not particularly limited as long as it is water-soluble (for example, soluble in water at 25° C. at an arbitrary ratio). Specifically, monovalent or divalent alcohols, alkylene glycols, glycol ethers, nitrogen-containing polar compounds, sulfur-containing polar compounds, and so on can be used. The content (mass %) of the water-soluble organic solvent in the ink is preferably 3.00 mass % or more and 50.00 mass % or less based on the total mass of the ink and further preferably 10.00 mass % or more and 40.00 mass % or less. When the content (mass %) of the water-soluble organic solvent is less than 3.00 mass %, the ink sticks to the ink jet printing apparatus, and sufficient sticking resistance may not be obtained. When the content (mass %) of the water-soluble organic solvent is greater than 50.00 mass %, poor ink supply may occur.

Other Additives

The ink can contain a surfactant, a pH adjuster, a corrosion inhibitor, a preservative, an antifungal agent, an antioxidant, a reducing inhibitor, an evaporation promoter, a chelating agent, and so on as needed, in addition to the above additives. In particular, the ink may contain a surfactant. The content (mass %) of the surfactant in the ink is preferably 0.10 mass % or more and 5.00 mass % or less based on the total mass of the ink and further preferably 0.10 mass % or more and 2.00 mass % or less. Examples of the surfactant include an anionic surfactant, a cationic surfactant, and a nonionic surfactant. In particular, since the surfactant is used for adjusting various physical properties of the ink, the surfactant may be a nonionic surfactant which has low affinity to titanium oxide particles and shows effects at a small amount.

Physical Property of Ink

Since the ink is an ink that is applied to an ink jet system, the physical properties thereof may be appropriately controlled. The surface tension at 25° C. of the ink is preferably 10 mN/m or more and 60 mN/m or less and further preferably 20 mN/m or more and 40 mN/m or less. The surface tension of an ink can be adjusted by appropriately determining the type and content of the surfactant in the ink. The viscosity at 25° C. of the ink may be 1.0 mPa·s or more and 10.0 mPa·s or less. The pH at 25° C. of the ink may be 7.0 or more and 9.0 or less. When the pH of the ink is within the above range, since the generation of a silanol group due to hydrolysis of the compound represented by the formula (1) progresses, the weak affinity between the titanium oxide particle and the compound represented by the formula (1) is effectively exhibited. The pH of an ink can be measured with a general pH meter loaded with a glass electrode.

EXAMPLES

The present disclosure will now be described in further detail with reference to Examples and Comparative Examples, but is not limited to the following Examples in any way unless it exceeds the gist thereof. "Part" and "%" regarding a component amount are mass basis unless otherwise specified. A dispersion of a titanium oxide particle is referred to as "pigment dispersion".

Preparation of Titanium Oxide

Commercially available rutile titanium oxide particle that was surface-treated in advance was used. The volume-based cumulative 50% particle size ($D_{50}$) of the titanium oxide particle was measured using a particle size analyzer (trade name: Nanotrac WaveII-EX150, manufactured by MicrotracBEL Corporation) by a dynamic light scattering method. Characteristics of each titanium oxide particle are shown in Table 1.

TABLE 1

Characteristics of titanium oxide particle

| Titanium oxide particle | Type | Manufacturer | Surface treatment | $D_{50}$ (nm) | Density ($g/cm^3$) |
|---|---|---|---|---|---|
| 1 | TIPAQUE PFC-211 | Ishihara Sangyo Kaisha, Ltd. | alumina, silica | 250 | 4 |
| 2 | TIPAQUE CR-60-2 | Ishihara Sangyo Kaisha, Ltd. | alumina, silica | 210 | 4 |

Preparation of Pigment Dispersion

Pigment Dispersion 1

A styrene-methyl methacrylate-methacrylic acid copolymer (resin 1) having an acid value of 150 mg KOH/g and a weight-average molecular weight of 10,000 was provided. An aqueous solution of the resin 1 in which the content of the resin (solid content) was 20.0% was prepared by neutralizing 20.0 parts of the resin 1 with potassium hydroxide in an amount equimolar to the acid value of the resin and adding an appropriate amount of pure water thereto. Ion-exchanged water was mixed with 40.0 parts of a titanium oxide particle 1 and 40.0 parts of an aqueous solution of the resin 1 such that the total of the components was 100.0 parts, and preliminary dispersion was performed using a homogenizer. Subsequently, dispersion treatment (main treatment) was performed in a paint shaker using 0.5-mm zirconium beads at 25° C. for 12 hours. The zirconia beads were removed by filtration, and an appropriate amount of ion-exchanged water was added to the filtrate as needed to prepare a pigment dispersion 1 in which the content of the titanium oxide particle was 40.0% and the content of the resin dispersion (resin 1) was 8.0%.

Pigment Dispersion 2

A pigment dispersion 2 in which the content of the titanium oxide particle was 40.0% and the content of the resin dispersion (resin 1) was 8.0% was prepared by the same procedure as in the pigment dispersion 1 except that the pigment was changed to a titanium oxide particle 2.

Preparation of Ink

A mixture of 25.0 parts of the pigment dispersion 1 and the components shown below was stirred. Subsequently, pressure filtration with a membrane filter having a pore size of 5.0 μm (manufactured by Sartorius AG) was performed to prepare an ink 1. An ink 2 was prepared by the same procedure as in the preparation of the ink 1 except that the pigment dispersion 2 was used instead of the pigment dispersion 1.

The detail of each of the mixed components is shown below:

- Acrylic resin particle (trade name: Vinyblan 2685, manufactured by Nissin Chemical Industry Co., Ltd., Resin particle content: 30%): 20.0 parts;
- Diethylene glycol: 10.0 parts;
- Diethylene glycol isobutyl ether: 10.0 parts;
- Fluorinated surfactant (trade name: Capstone FS-3100, manufactured by The Chemours Company): 1.0 parts; and
- Ion-exchanged water: 34.0 parts.

The viscosity (Pa·s) of inks 1 and 2 and the density ($g/cm^3$) of the liquid component were 8 Pa·s and 1.16 $g/cm^3$, respectively. The precipitation velocity of each ink was calculated by using these values. The results were that the precipitation velocity of the ink 1 was $1.2\times10^{-11}$ m/s. The precipitation velocity of the ink 2 was $8.5\times10^{-12}$ m/s.

The precipitation velocity was calculated by the following equation (Stokes equation) wherein v is the precipitation velocity, D is the particle size of titanium oxide, $\rho_p$ is the density of titanium oxide particle, $\rho_f$ is the density of ion-exchanged water, g is gravity acceleration, and $\eta$ is the density of ion-exchanged water.

$$v = \frac{D^2(\rho_p - \rho_f)g}{18\eta}$$

Liquid Discharge Head

Head 1

The liquid discharge head shown in FIGS. 2 to 5 was provided as a head 1. The maximum cross-sectional area S of the circulation path in the head 1 was 300 $mm^2$.

Evaluation

The ink 1 was set to an ink jet printing apparatus loaded with the head 1, and the ink was discharged in an environment of a temperature of 25° C. and a relative humidity of 50%. The circulation flow rate was set to 4.0 mL/min. That is, Q/S was $2.2\times10^{-6}$ m/s. As a result, it was confirmed that the effects of the present disclosure are sufficiently obtained.

According to the present disclosure, it is possible to provide an ink jet printing method with improved discharge stability of an ink containing titanium oxide.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-095971, filed Jun. 12, 2023, which is hereby incorporated by reference herein in its entirety.

What is claimed is:

1. An ink jet printing method for discharging an ink from a liquid discharge head, wherein the ink contains titanium oxide having a precipitation velocity of $1.0\times10^{-11}$ m/s or more based on a Stokes equation in the ink, the liquid discharge head comprises:

a discharge port for discharging the ink;

a pressure chamber for supplying the ink to the discharge port;

an energy-generating element for generating energy for discharging the ink;

an upstream flow channel for supplying a liquid to the pressure chamber;

a downstream flow channel communicating with the pressure chamber; and a pump communicating with the upstream flow channel and the downstream flow channel and forming a circulation path in which the ink circulates in an order of the upstream flow channel, the pressure chamber, the downstream flow channel, and the upstream flow channel, and a ratio of a flow rate Q of the ink in the circulation path to a maximum cross-sectional area S of the circulation path, Q/S [m/s], is higher than the precipitation velocity.

2. The ink jet printing method according to claim 1, wherein the flow rate Q is a flow rate in the pump.

3. The ink jet printing method according to claim 1, wherein the flow rate Q is 2.0 mL/min or more and 10 mL/min or less.

4. The ink jet printing method according to claim 1, wherein a volume of the ink flowing in the circulation path is 5.0 mL or more and 30 mL or less.

5. The ink jet printing method according to claim 1, wherein the liquid discharge head is configured so as to discharge a liquid while scanning in a direction orthogonal to a conveying direction of a print medium to which the ink is applied.

6. The ink jet printing method according to claim 1, wherein the liquid discharge head further comprises a first pressure regulation device configured so as to adjust a pressure of a liquid in the upstream flow channel.

7. The ink jet printing method according to claim 6, wherein the first pressure regulation device comprises a first valve chamber, a first pressure control chamber, a first opening communicating between the first valve chamber and the first pressure control chamber, and a first valve configured so as to be able to open and close the first opening.

8. The ink jet printing method according to claim 7, wherein the first pressure control chamber comprises a first pressing plate that has a portion of its surface formed of a first flexible member configured to be displaceable and can be displaced in conjunction with the first flexible member and a first biasing member that energizes the first pressing plate in a direction in which the volume of the first pressure control chamber is increased, and is configured such that the first valve can be opened and closed in response to displacement of the first pressing plate and the first flexible member.

9. The ink jet printing method according to claim 7, wherein a first communication port through which the first pressure control chamber communicates with the upstream flow channel is arranged vertically below the first pressure control chamber.

10. The ink jet printing method according to claim 1, wherein the liquid discharge head further comprises a second pressure regulation device configured so as to adjust a pressure of a liquid in the downstream flow channel.

11. The ink jet printing method according to claim 10, wherein the second pressure regulation device comprises a second valve chamber, a second pressure control chamber, a second opening communicating between the second valve chamber and the second pressure control chamber, and a second valve configured so as to be able to open and close the second opening.

12. The ink jet printing method according to claim 11, wherein a second communication port through which the second pressure control chamber communicates with the downstream flow channel is arranged vertically below the second pressure control chamber.

13. The ink jet printing method according to claim 1, wherein the liquid discharge head comprises:

a discharge unit including an element substrate including the discharge port and the pressure chamber; and a circulation unit including the pump, configured such that a liquid circulates between the discharge unit and the circulation unit, wherein in a portion where the discharge unit and the circulation unit are in fluid contact, a wall of a flow channel in the discharge unit fluid-connected to the circulation unit is perpendicular or oblique to a vertical direction.

14. The ink jet printing method according to claim 1, wherein a liquid storage portion is connected to the liquid discharge head through a tube that is configured so as to supply the ink to the liquid discharge head.

15. The ink jet printing method according to claim 1, wherein the pump is a piezoelectric pump.

16. The ink jet printing method according to claim 1, wherein a concentration of titanium oxide in the ink is 5.00 mass % or more and 20.00 mass % or less.

17. The ink jet printing method according to claim 1, wherein the maximum cross-sectional area S of the circulation path is 500 $mm^2$ or less.

18. The ink jet printing method according to claim 1, wherein the circulation path is formed entirely within the liquid discharge head.

* * * * *